(12) United States Patent
Zhang

(10) Patent No.: US 11,546,729 B2
(45) Date of Patent: Jan. 3, 2023

(54) SYSTEM AND METHOD FOR DESTINATION PREDICTING

(71) Applicant: BEIJING DIDI INFINITY TECHNOLOGY AND DEVELOPMENT CO., LTD., Beijing (CN)

(72) Inventor: Lingyu Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 419 days.

(21) Appl. No.: 16/798,481

(22) Filed: Feb. 24, 2020

(65) Prior Publication Data

US 2020/0221257 A1 Jul. 9, 2020

Related U.S. Application Data

(63) Continuation of application No. PCT/CN2018/094780, filed on Jul. 6, 2018.

(30) Foreign Application Priority Data

Aug. 24, 2017 (CN) .......................... 201710736286.3

(51) Int. Cl.
*G01C 21/00* (2006.01)
*H04W 4/02* (2018.01)
(Continued)

(52) U.S. Cl.
CPC ........ *H04W 4/025* (2013.01); *G01C 21/3484* (2013.01); *G01C 21/3617* (2013.01);
(Continued)

(58) Field of Classification Search
CPC ............... H04W 4/025; G01C 21/3484; G01C 21/3617; G06F 16/3346; G06Q 50/30; G06Q 30/0631; H04L 67/52
See application file for complete search history.

(56) References Cited

U.S. PATENT DOCUMENTS 8,918,284 B2 * 12/2014 Tokashiki .......... G01C 21/3484
701/538
2011/0238289 A1 9/2011 Lehmann et al.
(Continued)

FOREIGN PATENT DOCUMENTS

CN 103198653 A 7/2013
CN 104442625 A 3/2015
(Continued)

OTHER PUBLICATIONS

International Search Report in PCT/CN2018/094780 dated Sep. 25, 2018, 4 pages.
(Continued)

*Primary Examiner* — Richard G Keehn
(74) *Attorney, Agent, or Firm* — Metis IP LLC

(57) ABSTRACT

A system includes at least one non-transitory storage medium storing a set of instructions and at least one processor in communication with the at least one non-transitory storage medium. When executing the set of instructions, the at least one processor may be directed to cause the system to obtain a service request signal sent from a user terminal via wireless communication, wherein the service request signal encodes identifier data, a first departure location, and a first departure time; retrieve one or more historical records related to the identifier data, wherein a historical record includes a historical departure location, historical departure time and a historical destination location; determine, using a pre-stored destination matching algorithm, a selection probability of the one or more historical destination location;
(Continued)

determine, based on the selection probability, a suggested destination location, which is the same as the one or more historical destination locations.

16 Claims, 10 Drawing Sheets

(51) Int. Cl.

| | | |
|---|---|---|
| G06F 16/33 | (2019.01) | |
| G01C 21/34 | (2006.01) | |
| G01C 21/36 | (2006.01) | |
| G06Q 50/30 | (2012.01) | |
| H04L 67/52 | (2022.01) | |

(52) U.S. Cl.
CPC ......... *G06F 16/3346* (2019.01); *G06Q 50/30* (2013.01); *H04L 67/52* (2022.05)

(56) References Cited

U.S. PATENT DOCUMENTS

| | | | | |
|---|---|---|---|---|
| 2013/0117109 | A1* | 5/2013 | Busch | G06Q 30/0255 |
| | | | | 455/456.3 |
| 2014/0129132 | A1* | 5/2014 | Yoshizu | G01C 21/362 |
| | | | | 701/400 |
| 2014/0279723 | A1* | 9/2014 | McGavran | H04W 4/025 |
| | | | | 707/610 |
| 2014/0309806 | A1* | 10/2014 | Ricci | G06Q 10/20 |
| | | | | 701/1 |
| 2015/0134244 | A1 | 5/2015 | Hershey et al. | |
| 2015/0339397 | A1 | 11/2015 | Brush et al. | |
| 2016/0025497 | A1* | 1/2016 | Baalu | G01C 21/005 |
| | | | | 701/461 |
| 2016/0212229 | A1* | 7/2016 | McGavran | H04L 67/52 |
| 2016/0334796 | A1* | 11/2016 | Inoue | B60W 30/00 |
| 2016/0377448 | A1* | 12/2016 | Burns | G01C 21/3617 |
| | | | | 706/11 |
| 2017/0292847 | A1* | 10/2017 | Ota | G01C 21/34 |

FOREIGN PATENT DOCUMENTS

| | | | | | |
|---|---|---|---|---|---|
| CN | 104833365 | A | | 8/2015 | |
| CN | 105243441 | A | | 1/2016 | |
| CN | 106157602 | A | | 11/2016 | |
| CN | 106919996 | A | | 7/2017 | |
| CN | 106949901 | A | * | 7/2017 | ......... G01C 21/3617 |
| CN | 107154969 | A | * | 9/2017 | ............ G06Q 50/10 |
| EP | 1098287 | B1 | | 8/2004 | |
| TW | 201741631 | A | * | 12/2017 | |
| WO | 2017028821 | A | | 2/2017 | |

OTHER PUBLICATIONS

Written Opinion in PCT/CN2018/094780 dated Sep. 26, 2018, 4 pages.
First Office Action in Chinese Application No. 201710736286.3 dated Apr. 2, 2020, 18 pages.
The Second Office Action in Chinese Application No. 201710736286.3 dated Feb. 2, 2021, 22 pages.
Li, Donghai et al., Joint Probability Density Function of Multidimensional Dependent Random Variables, Spectrum Estimation Theory and Applications, 2014, 7 pages.

* cited by examiner

SYSTEM AND METHOD FOR DESTINATION PREDICTING

CROSS-REFERENCE TO RELATED APPLICATIONS

This application is a continuation of International Application No. PCT/CN2018/094780 filed on Jul. 6, 2018, which claims priority of Chinese Patent Application No. 201710736286.3 filed on Aug. 24, 2017, the contents of each of which are incorporated herein by reference.

TECHNICAL FIELD

The present disclosure generally relates to the field of big data recommendation technology, particularly, to a destination predicting method and system.

BACKGROUND

With the continuous development of communication technology and computer technology, more and more users may seek services conveniently on an online to offline service platform. For example, a user may complete a vehicle reservation by selecting a departure location, a destination location and/or a departure time on an online to offline vehicle reservation platform. As another example, a user may seek a delivery service (e.g., food delivery service, etc.) by selecting a delivery address and/or a delivery time on an online to offline delivery service platform. In these two examples, those users may have to manually input the destination location or the delivery address, which may be cumbersome and inconvenience. Thus, it is desirable to develop a system and method to facilitate such a computer input

SUMMARY

According to an aspect of the present disclosure, a system configured to provide a predicted destination to a user may include at least one non-transitory storage medium storing a set of instructions and at least one processor in communication with the at least one non-transitory storage medium. When executing the set of instructions, the at least one processor may cause the system to obtain a service request signal sent from a user terminal via wireless communication. The service request signal may encode identifier data, a first departure location, and a first departure time. The at least one processor may also cause the system to retrieve one or more historical records related to the identifier data. A historical record may include a historical departure location, historical departure time and a historical destination location. The at least one processor may also cause the system to determine, using a pre-stored destination matching algorithm, a selection probability of the one or more historical destination locations. The at least one processor may also cause the system to determine, based on the selection probability, a suggested destination location. The suggested destination location may be the same as the one or more historical destination locations. The at least one processor may also cause the system to generate and display an indicator signifying the suggested destination location on a user interface of the user terminal.

In some embodiments, the at least one processor may further cause the system to determine the one more historical records matching the first departure location and/or the first departure time. The at least one processor may cause the system to determine the selection probability, for each historical destination location of the one or more historical records matching the first departure location and/or the first departure time.

In some embodiments, to determine the selection probability related to the first departure location and the first departure time for each historical destination location of the one or more historical records, the at least one processor may further cause the system to determine a first posterior probability, related to the first departure location, for each historical destination location of the one or more historical records, based on the historical departure location and the historical destination location of the one or more historical records. The at least one processor may cause the system to determine a second posterior probability, related to the first departure time, for each historical destination location of the one or more historical records, based on the historical departure time and the historical destination location of the one or more historical records. The at least one processor may also cause the system to determine the selection probability, related to the first departure location and the first departure time, for each historical destination location of the one or more historical records, based on the first posterior probability, the second posterior probability, and the prior probability.

In some embodiments, to determine the selection probability related to the first departure location and the first departure time for each historical destination location of the one or more historical records, the at least one processor may further cause the system to determine the selection probability according to equation:

$$P(D_m \mid F, T) = \frac{P(F \mid D_m)P(T \mid D_m) * P(D_m)}{\sum_{m=1}^{N} P(F \mid D_m)P(F, T \mid D_m) * P(D_m)},$$

where $D_m$ denotes an mth historical destination location, F denotes the first departure location in the service request signal, T denotes the first departure time in the service request signal, $P(F \mid D_m)$ denotes the first posterior probability, $P(T \mid D_m)$ denotes the second posterior probability, $P(D_m)$ denotes the prior probability, N denotes a total number of the historical destination locations in the one or more historical destination locations, wherein $1 \leq m \leq N$, and both N and m are integers.

In some embodiments, to determine the selection probability related to the first departure location and the departure time for each historical destination location of the one or more historical records, the at least one processor may further cause the system to determine a first posterior probability, related to the first departure location, for each historical destination location of the one or more historical records, based on the historical departure location and the historical destination location of the one or more historical records. The at least one processor may cause the system to determine a third posterior probability, related to the first departure location and each historical destination location of the one or more historical records, for the departure time, based on the historical departure location, the historical departure time and the historical destination location of the one or more historical records. The at least one processor may also cause the system to determine the selection probability, related to the first departure location and the departure time, for each historical location of the one or more historical records, based on the first posterior probability, the third posterior probability, and the prior probability.

In some embodiments, to determine the selection probability related to the first departure location and the first departure time for each historical destination location of the one or more historical records, the at least one processor may further cause the system to determine the selection probability according to an equation:

$$P(D_m | F, T) = \frac{P(T | F, D_m)P(T | D_m) * P(D_m)}{\sum_{m=1}^{N} P(T | F, D_m)P(T | D_m) * P(D_m)},$$

where $D_m$ denotes an mth historical destination location, F denotes the first departure location in the service request signal, T denotes the first departure time in the service request signal, $P(T|F, D_m)$ denotes the third posterior probability, $P(F|D_m)$ denotes the first posterior probability, $P(D_m)$ denotes the prior probability, N denotes a total number of the historical destination locations in the one or more historical destination locations, wherein $1 \leq m \leq N$, and both N and m are integers.

In some embodiments, the historical departure location may provide a historical longitude and a historical latitude. To determine the selection probability, related to the first departure location and the first departure time, for each historical destination location of the one or more historical records, the at least one processor may further cause the system to determine a centralized tendency matrix of the one or more historical records. The centralized tendency matrix may provide a historical longitude centralized tendency for the historical longitude of the one or more historical records, a historical latitude centralized tendency for the historical latitude of the one or more historical records, and a historical temporal centralized tendency for the historical departure time of the one or more historical records. The at least one processor may cause the system to determine a covariance matrix, related to the historical longitude of the one or more historical records and the historical latitude of the one or more historical records and the historical departure time of the one or more historical records, based on the one or more historical records and the centralized tendency matrix. The at least one processor may also cause the system to determine a probability distribution based on the one or more historical records, the centralized tendency matrix, the prior probability and the covariance matrix. The at least one processor may also cause the system to determine the selection probability, related to the first departure location and the first departure time, for each historical location of the one or more historical records, based on the probability distribution function.

In some embodiments, to determine the selection probability related to the first departure location and the first departure time for each historical destination location of the one or more historical records, the at least one processor may further cause the system to determine the selection probability according to equation:

$$P(D_m | F, T) =$$

$$\frac{\frac{1}{(2\pi)^{3/2}} \frac{1}{\sqrt{\det C}} \exp\left[-\frac{1}{2}(X-\mu)^T C^{-1}(X-\mu)\right] * P(D_m)}{\sum_{m=1}^{N} \frac{1}{(2\pi)^{3/2}} \frac{1}{\sqrt{\det C}} \exp\left[-\frac{1}{2}(X-\mu)^T C^{-1}(X-\mu)\right] * P(D_m)},$$

where $D_m$ denotes an mth historical destination location, F denotes the first departure location in the service request signal, T denotes the first departure time in the service request signal, Flat denotes the latitude of the first departure location in the service request, Flng denotes the longitude of the first departure location in the service request, $$X = (T, \text{Flat}, \text{Flng}^T), \mu = (E\{T_p\}, E\{\text{Flat}_p\}, E\{\text{Flng}_p\})^T,$$

$$C = \begin{bmatrix} c_{11} & c_{12} & c_{13} \\ c_{21} & c_{22} & c_{23} \\ c_{31} & c_{32} & c_{33} \end{bmatrix}, c_{ij} = \text{Cov}(x_i, x_j) = E\{[x_i - \mu_i][x_j - \mu_j]\},$$

$$x_1 = T_p, x_2 = \text{Flat}_p, x_3 = \text{Flng}_p, i = \{1, 2, 3\}, j = \{1, 2, 3\},$$

$T_p$ denotes a historical departure time, $\text{Flat}_p$ denotes the latitude of a historical departure location, $\text{Flng}_p$ denotes the longitude of the historical departure location.

In some embodiments, the probability distribution may be a multivariate Gaussian distribution.

In some embodiments, the historical departure location may provide a historical longitude and a historical latitude. To determine the selection probability related to the first departure location and the first departure time for each historical destination location of the one or more historical records, the at least one processor may further cause the system to determine a first centralized tendency matrix of a first condition based on the one or more historical records. The at least one processor may cause the system to determine a first covariance matrix of the first condition based on the first centralized tendency matrix and the one or more historical records. The at least one processor may also cause the system to determine a second centralized tendency matrix of a second condition based on the one or more historical records. The at least one processor may also cause the system to determine a second covariance matrix of the second condition based on the second centralized tendency matrix and the one or more historical records. The at least one processor may also cause the system to determine the selection probability, related to the first departure location and the departure time for each historical location of the one or more historical records, based on the first centralized tendency matrix of the first condition, the second centralized tendency matrix of the second condition, the first covariance matrix of the first condition and the second covariance matrix of the second condition.

In some embodiments, to determine the selection probability related to the first departure location and the first departure time for each historical destination location of the one or more historical records, the at least one processor may further cause the system to determine the selection probability according to equation:

$$P(Y = D_m | F, T) = \frac{1}{1 + \exp(X^T A X + \theta^T X + b)},$$

where $D_m$ denotes an mth historical destination location, F denotes the first departure location in the service request signal, T denotes the first departure time in the service request signal, Flat denotes the latitude of the first departure location in the service request, Flng denotes the longitude of the first departure location in the service request, $$X = (T, \text{Flat}, \text{Flng})^T, b = -\frac{1}{2}(\mu^T C^{-1} \mu - \mu'^T C'^{-1} \mu') + k,$$

$$k = \ln\left(\frac{1 - P(Y = D_m)}{P(Y = D_m)} \times \sqrt{\frac{|C'|}{|C|}}\right),$$

$$A = -\frac{1}{2}(C^{-1} - C'^{-1}), \theta^T = (\mu^T C^{-1} - \mu'^T C'^{-1}),$$

$\mu$ is an expectation vector of X under the condition of $Y=D_m$, $\mu'$ is an expectation vector of X under the condition of $Y \neq D_m$, C is a covariance matrix of X under the condition of $Y=D_m$, C' is a covariance matrix of X under the condition of $Y \neq D_m$, Y denotes a destination location variable, and the range of the destination location variable is all historical destination locations in the one or more historical records related to the identifier data.

In some embodiments, the at least one processor may further cause the system to determine, as the suggested destination location, the one or more historical destination locations with the selection probability larger than a preset value. Alternatively or optionally, the at least one processor may cause the system to determine, as the suggested destination location, one with a largest selection probability among the one or more historical destination locations if the one or more historical destination locations are more than one.

In some embodiments, the at least one processor may further cause the system to obtain cancellation of the suggested destination location and a true destination location from the user via the user terminal. The at least one processor may cause the system to generate a updated historical record based on the identifier data, including the first departure location, the first departure time and the true destination location.

According to another aspect of the present disclosure, a method implemented on at least one device, each of which has at least one processor and a storage medium, may include one or more of the following operations performed by the at least one processor. The method may include obtaining a service request signal sent from a user terminal via wireless communication. The service request signal may encode identifier data, a first departure location, and a first departure time. The method may also include retrieving one or more historical records related to the identifier data. A historical record may include a historical departure location, historical departure time and a historical destination location. The method may also include determining, using a pre-stored destination matching algorithm, a selection probability of the one or more historical destination location. The method may also include determining, based on the selection probability, a suggested destination location. The suggested destination location may be the same as the one or more historical destination locations. The method may also include generating and displaying an indicator signifying the suggested destination location on a user interface of the user terminal.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
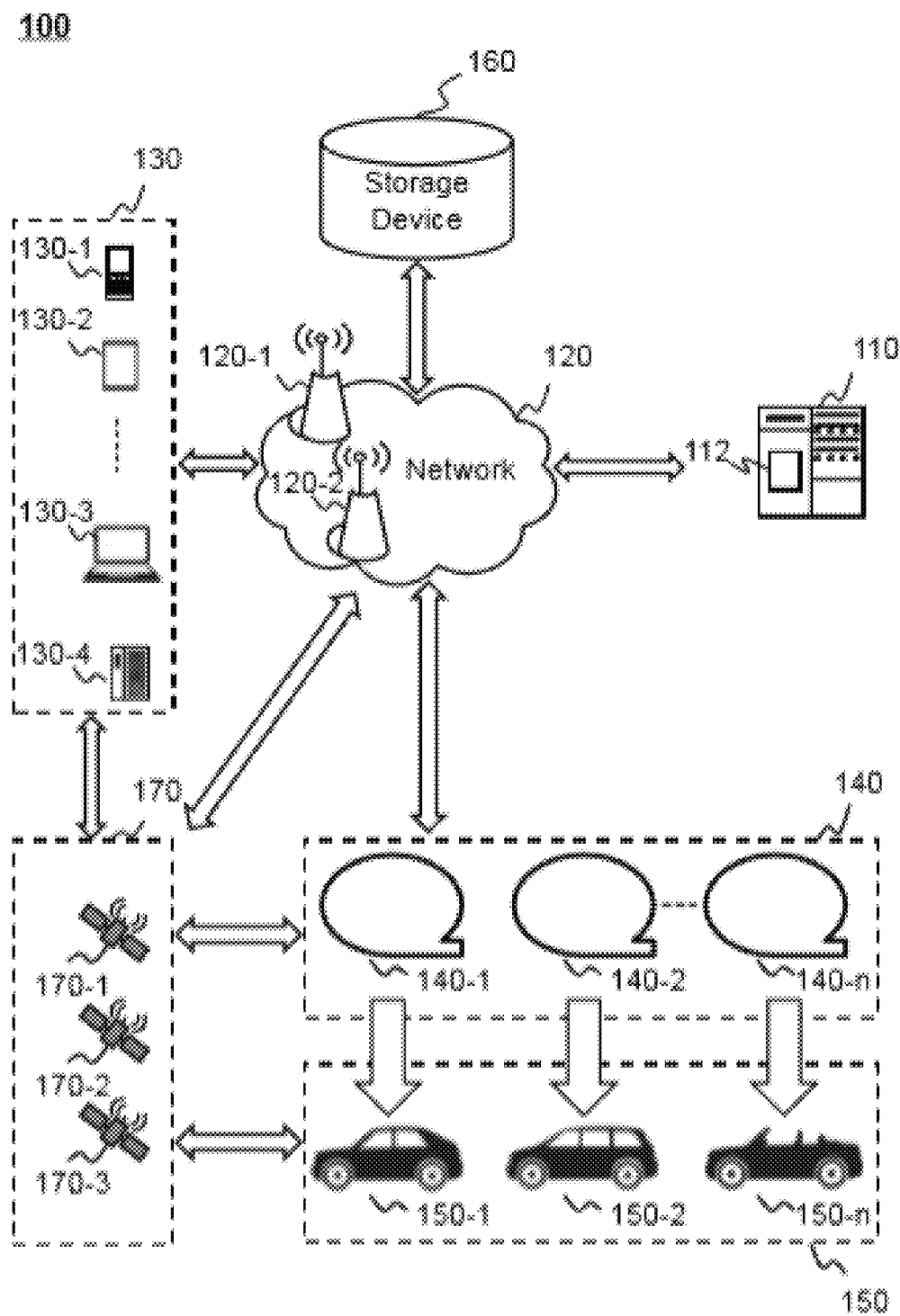
FIG. 1 is a schematic diagram of an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to distributing a request for a transportation service, it should also be understood that the present disclosure is not intended to be limiting. The system or method of the present disclosure may be applied to any other kind of online to offline service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," and "service request signal" in the present disclosure are used interchangeably to refer to a request that may be initiated by a passenger, a service requester, a customer, a driver, a provider, a service provider, or the like, or any combination thereof. The service request may be accepted by any one of a passenger, a service requester, a customer, a driver, a provider, or a service provider. The service request may relate to the point of interest (POI) where the user may want to go.

The term "service provider terminal" and "driver terminal" in the present disclosure are used interchangeably to refer to a mobile terminal that is used by a service provider to provide a service or facilitate the providing of the service. The term "service requester terminal" and "user terminal" in the present disclosure are used interchangeably to refer to a mobile terminal that is used by a service requester to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for destination location/delivery address suggestion in an online to offline service system. The system may receive a user's service request encoding identifier data, a departure location, and a departure time through a user terminal. Based on the service request, the system may retrieve one or more historical records corresponding to the user, where a historical record may include a historical departure location, a historical departure time, and a historical destination location. The system may then determine a selection probability of one or more historical destination locations according to the service request and the one or more historical records corresponding to the user using a pre-stored destination matching algorithm. Based on the selection probability of the one or more historical destination locations, the system may output one or more suggested destination locations to the user. Thus, the user may only need to trigger the service request to obtain the one or more suggested destination locations matching with the service request, which may simplify the user operation and improve the user experience.

It should be noted that online to offline transportation service, such as online taxi-hailing, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through a telephone call, the service request and acceptance by a service provider may occur only between the passenger and the service provider (e.g., a taxi company or agent). Online taxi, however, allows a user of the service to reserve a service and automatic distribute the reservation service request to a vast number of individual service providers (e.g., taxi drivers) distance away from the user. It also allows a plurality of service providers to respond the service request simultaneously and in real-time. Therefore, through the Internet, the online to offline transportation systems may provide a much more efficient transaction platform for the users and the service providers that may never meet in a traditional pre-Internet transportation service system. Allocating appointment orders provides a service for both requesters and service providers efficiently.

FIG. 1 is a schematic diagram illustrating an exemplary online to offline service system according to some embodiments of the present disclosure. For example, online to offline service system 100 may be an online to offline transportation service platform for transportation services. The online to offline service system 100 may include a server 110, a network 120, a service requester terminal 130, a service provider terminal 140, a vehicle 150, a storage device 160, and a navigation system 170.

The online to offline service system 100 may provide a plurality of services. Exemplary service may include a taxi-hailing service, a chauffeur service, an express car service, a carpool service, a bus service, a driver hire service, and a shuttle service. In some embodiments, the online to offline service may be any online service, such as booking a meal, shopping, or the like, or any combination thereof.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the service requester terminal 130, the service provider terminal 140, and/or the storage device 160 via the network 120. As another example, the server 110 may be directly connected to the service requester terminal 130, the service provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the service request to perform one or more functions described in the present disclosure. For example, the processing engine 112 may determine one or more suggested destination locations for the service request received from the service requester terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online to offline service system 100 (e.g., the server 110, the service requester terminal 130, the service provider terminal 140, the vehicle 150, the storage device 160, and the navigation system 170) may transmit information and/or data to other component(s) of the online to offline service system 100 via the network 120. For example, the server 110 may receive a service request from the service requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, a passenger may be an owner of the service requester terminal 130. In some embodiments, the owner of the service requester terminal 130 may be someone other than the passenger. For example, an owner A of the service requester terminal 130 may use the service requester terminal 130 to transmit a service request for a passenger B or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device in the vehicle 130-4 may include an onboard computer, an onboard television, etc. In some embodiments, the service requester terminal 130 may be a device with positioning technology for locating the position of the passenger and/or the service requester terminal 130.

The service provider terminal 140 may include a plurality of service provider terminals 140-1, 140-2, . . . , 140-n. In some embodiments, the service provider terminal 140 may be similar to, or the same device as the service requester terminal 130. In some embodiments, the service provider terminal 140 may be customized to be able to implement the online to offline transportation service. In some embodiments, the service provider terminal 140 may be a device with positioning technology for locating the service provider, the service provider terminal 140, and/or a vehicle 150 associated with the service provider terminal 140. In some embodiments, the service requester terminal 130 and/or the service provider terminal 140 may communicate with another positioning device to determine the position of the passenger, the service requester terminal 130, the service provider, and/or the service provider terminal 140. In some embodiments, the service requester terminal 130 and/or the service provider terminal 140 may periodically transmit the positioning information to the server 110. In some embodiments, the service provider terminal 140 may also periodically transmit the availability status to the server 110. The availability status may indicate whether a vehicle 150 associated with the service provider terminal 140 is available to carry a passenger. For example, the service requester terminal 130 and/or the service provider terminal 140 may transmit the positioning information and the availability status to the server 110 every thirty minutes. As another example, the service requester terminal 130 and/or the service provider terminal 140 may transmit the positioning information and the availability status to the server 110 each time the user logs into the mobile application associated with the online to offline transportation service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-$n$. One vehicle may correspond to one type of services (e.g., a taxi-hailing service, a chauffeur service, an express car service, a carpool service, a bus service, a driver hire service, or a shuttle service).

The storage device 160 may store data and/or instructions. In some embodiments, the storage device 160 may store data obtained from the service requester terminal 130 and/or the service provider terminal 140. In some embodiments, the storage device 160 may store data and/or instructions that the server 110 may execute or use to perform exemplary methods described in the present disclosure. In some embodiments, storage device 160 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components of the online to offline service system 100 (e.g., the server 110, the service requester terminal 130, or the service provider terminal 140). One or more components of the online to offline service system 100 may access the data or instructions stored in the storage device 160 via the network 120. In some embodiments, the storage device 160 may be directly connected to or communicate with one or more components of the online to offline service system 100 (e.g., the server 110, the service requester terminal 130, the service provider terminal 140). In some embodiments, the storage device 160 may be part of the server 110.

The navigation system 170 may determine information associated with an object, for example, one or more of the service requester terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may transmit the information mentioned above to the network 120, the service requester terminal 130, the service provider terminal 140, or the vehicle 150 via wireless connections.

In some embodiments, one or more components of the online to offline service system 100 (e.g., the server 110, the service requester terminal 130, the service provider terminal 140) may have permissions to access the storage device 160. In some embodiments, one or more components of the online to offline service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components of the online to offline service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element (or component) of the online to offline service system 100 performs, the element may perform through electrical signals and/or electromagnetic signals. For example, when a service requester terminal 130 transmits out a service request to the server 110, a processor of the service requester terminal 130 may generate an electrical signal encoding the request. The processor of the service requester terminal 130 may then transmit the electrical signal to an output port. If the service requester terminal 130 communicates with the server 110 via a wired network, the output port may be physically connected to a cable, which further may transmit the electrical signal to an input port of the server 110. If the service requester terminal 130 communicates with the server 110 via a wireless network, the output port of the service requester terminal 130 may be one or more antennas, which convert the electrical signal to electromagnetic signal. Similarly, a service provider terminal 130 may receive an instruction and/or service request from the server 110 via electrical signal or electromagnet signals. Within an electronic device, such as the service requester terminal 130, the service provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
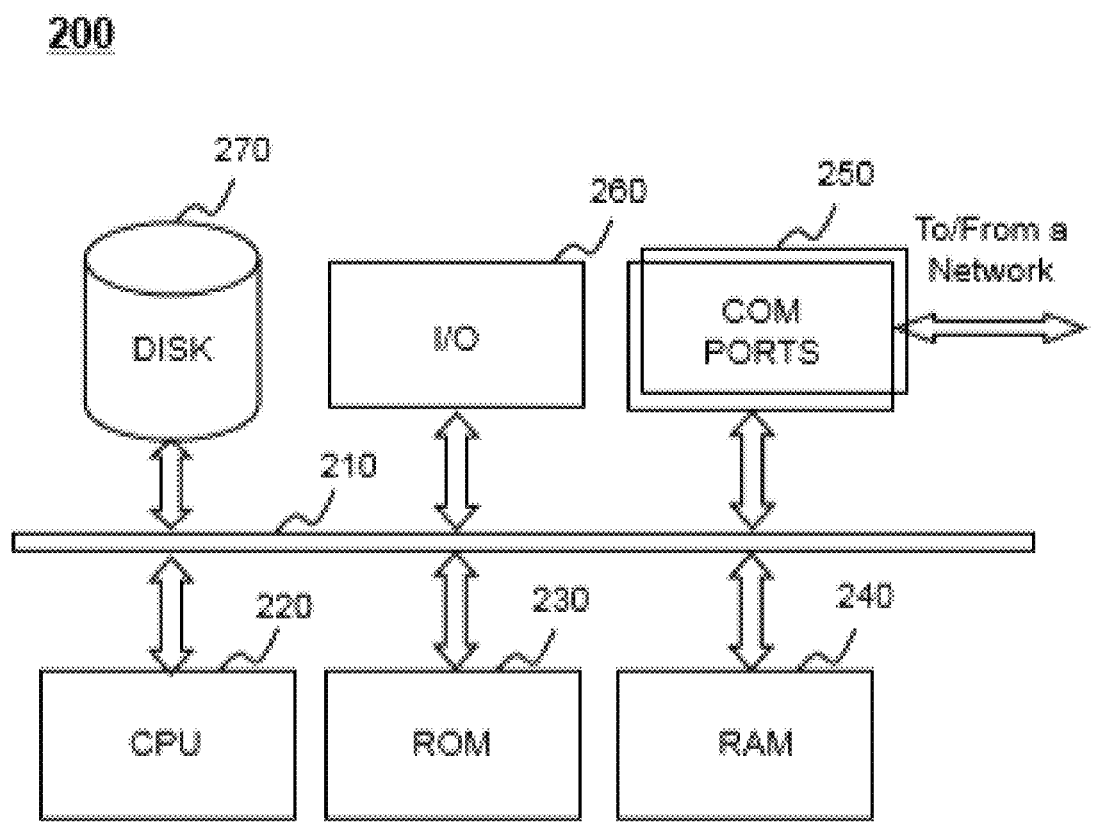
FIG. 2 is a block diagram illustrating an exemplary computing device according to some embodiments of the present disclosure.

FIG. 2 is a schematic diagram illustrating exemplary hardware and software components of a computing device 200 on which the server 110, the service requester terminal 130, and/or the service provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a special purpose computer in some embodiments. The computing device 200 may be used to implement an online to offline system for the present disclosure. The computing device 200 may implement any component of the online to offline service as described herein. In FIGS. 1-2, only one such computer device is shown purely for convenience purposes. One of ordinary skill in the art would understood at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU, or processor) 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU/processor 220. The methods and/or processes of the present disclosure may be implemented as the program instructions. The computing device 200 may also include an I/O component 260, supporting input/output between the computer and other components therein such as a user interface element. The computing device 200 may also receive programming and data via network communications.

Merely for illustration, only one CPU/processor 220 is described in the computing device 200. However, it should be note that the computing device 200 in the present disclosure may also include multiple CPUs/processors, thus operations and/or method steps that are performed by one CPU/processor 220 as described in the present disclosure may also be jointly or separately performed by the multiple CPUs/processors. For example, if in the present disclosure the CPU/processor 220 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

Figure 3:
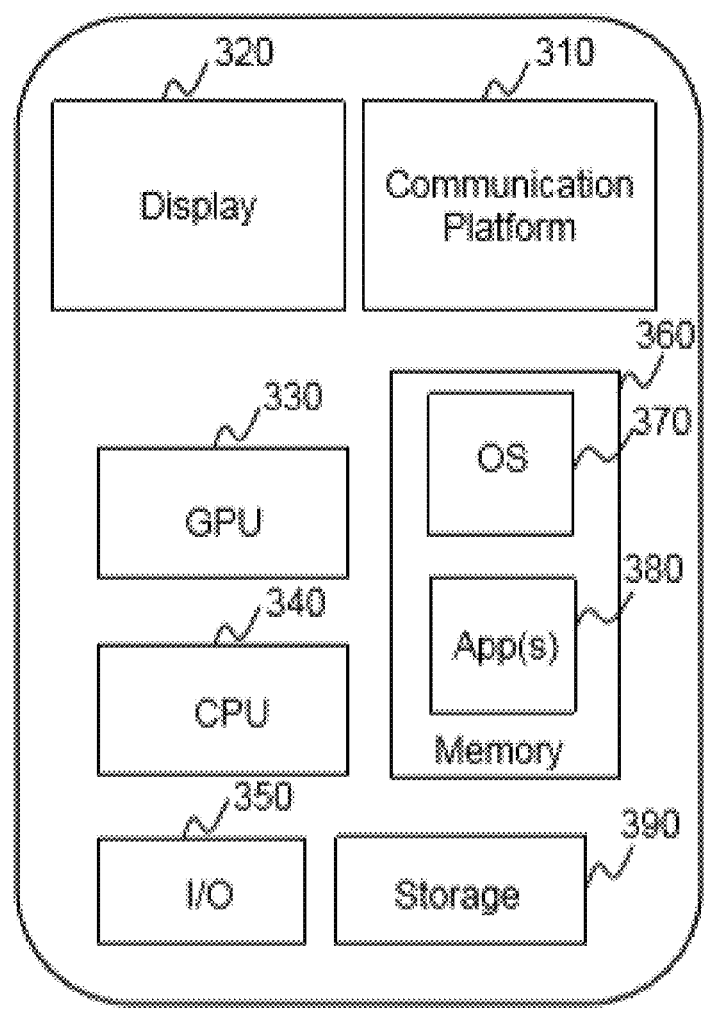
FIG. 3 is a block diagram of an exemplary mobile device configured to implement a specific system disclosed in the present disclosure.

FIG. 3 is a schematic diagram illustrating exemplary hardware and/or software components of an exemplary mobile device 300 on which a use terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 112 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
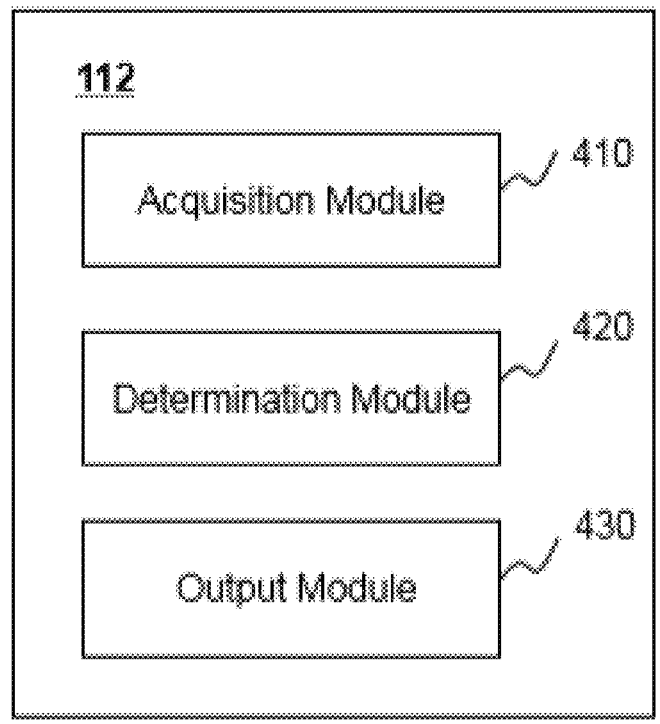
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may be in communication with a computer-readable storage (e.g., the storage 160, the passenger terminal 130, or the driver terminal 140) and may execute instructions stored in the computer-readable storage medium. The processing engine 112 may include an acquisition module 410, a determination module 420, and an output module 430.

The acquisition module 410 may obtain a service request sent from a user terminal via wireless communication. The service request (also referred to as "the service request signal") may encode identifier data, a first departure location, and a first departure time. The identifier data included in the service request may be identity information corresponding to a user, and the online to offline service system 100 may identify the user based on the corresponding identifier data. In some embodiments, the first departure location may be the current geographical location of the user. The first departure time may be a trigger time of the service request. In some embodiments, the first departure location and the first departure time may be input by the user through a user interface of the user terminal. Further, the acquisition module 410 may obtain travel information of the user related to the identifier data based on the service request.

The determination module 420 may retrieve one or more historical records related to the identifier data from the server 110. A historical record may include a historical departure location, a historical departure time, and a historical destination location, etc.

The determination module 420 may determine a selection probability of the one or more historical destination locations using a pre-stored destination matching algorithm. The determination of the selection probability of the one or more historical destination locations according to the service request and the one or more historical records corresponding to the user may actually be a determination of $P(D_m|F, T)$. $D_m$ denotes a mth historical destination location. F denotes a first departure location in the user's service request. T denotes a first departure time in the user's service request. $P(D_m|F, T)$ denotes a selection probability of going to the mth historical destination location on the premise of the first departure location and the first departure time.

In some embodiments, determination module 420 may include filtering the one or more historical records according to the service request including the identifier data, only historical record(s) matched with the service request may be retrieved. According to the service request and the one or more filtered historical records related to the identifier data, the pre-stored destination matching algorithm may then be used to determine a selection probability of the one or more historical destination locations in the one or more filtered historical records.

The determination module 420 may determine a suggested destination location that is the same as the one or more historical destination locations based on the selection probability. In some embodiments, determination module 420 may determine one or more suggested destination locations.

The output module 430 may generate and display an indicator signifying the suggested destination location on a user interface of the user terminal. The indicator may include the name of the suggested destination location, the latitude and longitude of the suggested destination location, an icon shown on a map of the travel service platform at the suggested destination location, etc.

In some embodiments, the processing engine 112 may further include an updating module (not shown in FIG. 4). The updating module may keep historical records updated according to a user's actual needs, while the suggested destination location may be or may be not the same as the user's actual destination location. The updating process may be that the user terminal may send the user's travel information (the first departure time, the first departure location, and an actual destination location) to the server, so that the server may store the travel information for updating the user's historical records.

In some embodiments, the processing engine 112 may further include an actual destination location determination module (not shown in FIG. 4). The actual destination location determination module may determine the actual destination location of the user through the user's operation. The user's operation may include selecting a suggested destination location, canceling the suggested destination location, and entering the actual destination location. When the user selects a suggested destination location, the actual destination location determination module may determine the selected suggested destination location as the actual destination location. When the suggested destination location output by the output module 430 is not the actual needs of the user, the user may cancel the suggested destination location and input the actual destination location. The process engine 112 may generate an updated historical record based on the identifier data, including the first departure location, the first departure time and the actual destination location.

It should be noted that the above descriptions of processing engine 112 are provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. For example, the processing engine 112 may further include a storage module (not shown in FIG. 4). The storage module may be configured to store data generated during any process performed by any component of in the processing engine 112. As another example, each component of the processing engine 112 may associate with a storage module. Additionally or alternatively, the components of the processing engine 112 may share a common storage module. Similar modifications should fall within the scope of the present disclosure.

Figure 5A:
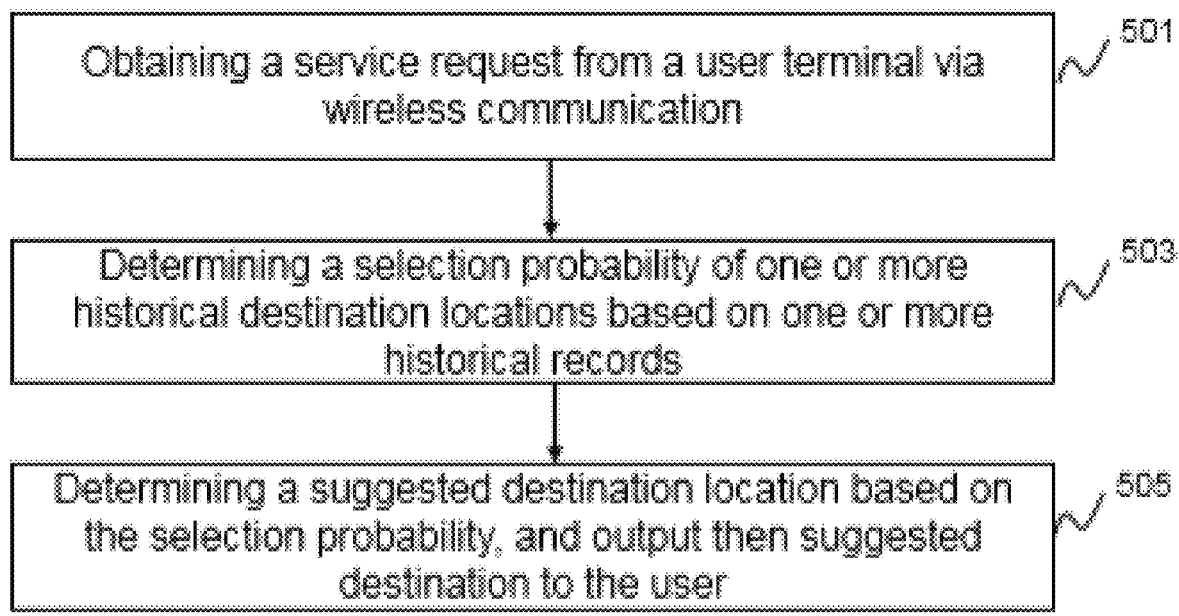
FIGS. 5A and 5B are flowcharts of an exemplary process for destination predicting according to some embodiments of the present disclosure.
Figure 9:
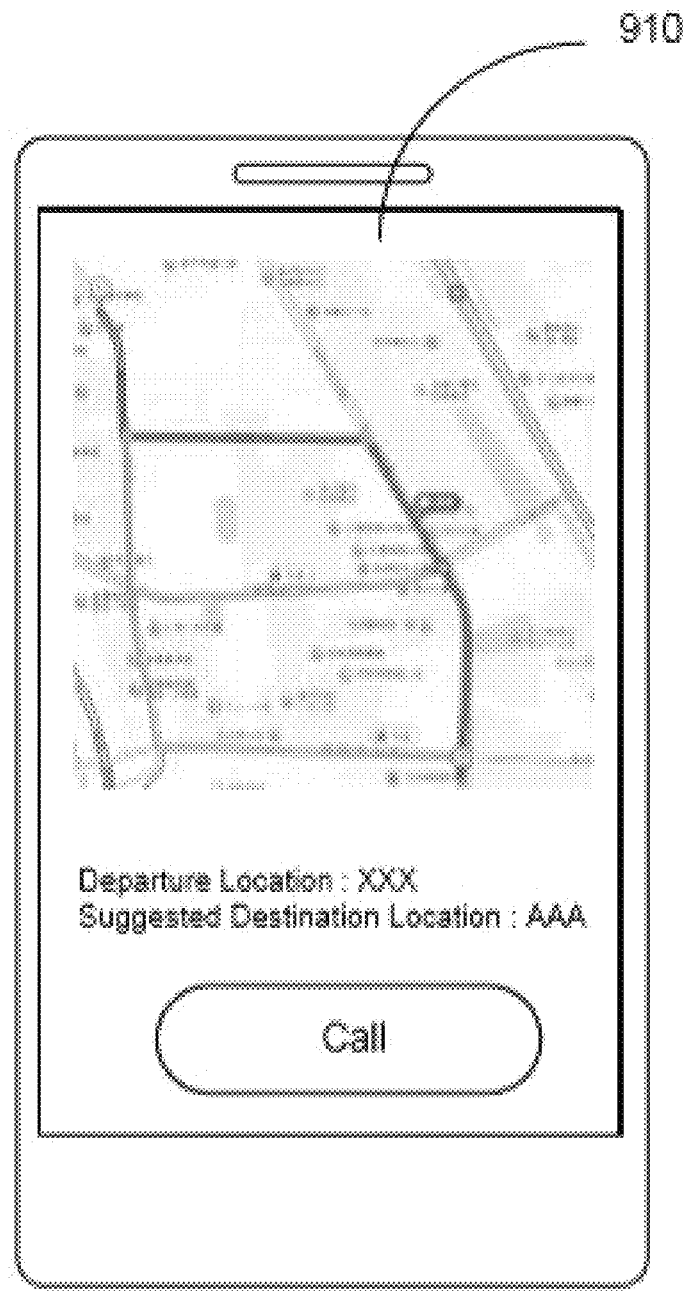

FIG. 5A is a flowchart illustrating an exemplary process for destination predicting according to some embodiments of the present disclosure. The process 500 may be executed by the online to offline service system 100. For example, the process 500 may be implemented as a set of instructions (e.g., an application) stored in the storage device 130. The processing engine 112 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 9 and described below is not intended to be limiting.

In 501, the processor (e.g., the acquisition module 410 of the processing engine 112) may obtain a service request from a user terminal via wireless communication. A service request, from a user via the user terminal, may relate to a destination location where the user may want to go from a first departure location at first departure time. In some embodiments, the first departure location may be a current location of the user obtained through a Global Positioning System (also referred to as "GPS" in the present disclosure) on the user terminal. The first departure time may be a trigger time when the user activating an APP (e.g., an online to offline travel service platform) installed in the user terminal. In some embodiments, the first departure location and/or the first departure time may be input by the user. In some embodiments, the service request may include identifier data. Identifier data included in the service request may be identity information corresponding to the user, and the processing engine 112 may identify the user based on the corresponding identifier data.

In some embodiments, the processor (e.g., the acquisition module 410 of the processing engine 112) may further obtain historical travel information of the user based on the service request. The historical travel information may be historical travel records (also referred to as "historical record") of the user. A historical record may be a historical service request completed in the past. A historical service request may relate to a historical destination location where a user actually wants to go from a historical departure location at historical departure time. Thus, a historical record may at least include a historical departure location, a historical departure time, and a historical destination location. In some embodiments, each historical record may include identifier data for the processor to identify the user.

In some embodiments, the processor may obtain one or more historical records that a historical departure time of the one or more historical records is the same as the first departure time in the service request related to the identifier data. In some embodiments, the processor may obtain one or more historical records that a historical departure location of the one or more historical records is the same as the first departure location in the service request related to the identifier data. In some embodiments, the processor may obtain all historical records that belong to a same user determined based on the identifier data included in the service request.

In 503, the processor (e.g., the determination module 420 of the processing engine 112) may determining a selection probability of one or more historical destination locations based on one or more historical records using a pre-stored destination matching algorithm. Specifically, the user terminal may obtain one or more historical records related to the identifier data from the server in advance. In some embodiments, the user terminal may send the service request including the identifier data to the server, and the server may return the one or more historical records corresponding to the user to the user terminal according to the identifier data in the service request after receiving the service request. The one or more historical records may include one or more historical destination locations related to the identifier data.

In some embodiments, a determination of the selection probability of the one or more historical destination locations according to the service request and the one or more historical records corresponding to the user may actually be a determination of $P(D_m|F, T)$. $D_m$ denotes a mth historical destination location among the one or more historical records related to the identifier data. F denotes a first departure location in the user's service request. T denotes a first departure time in the user's service request. $P(D_m|F, T)$ denotes a selection probability of that a historical record includes the mth historical destination location given that a historical record includes the first departure location and the first departure time among the one or more historical records.

In 505, the processor (e.g., the determination module 420 of the processing engine 112) may determine a suggested destination location based on the selection probability, and output the suggested destination to the user. In some embodiments, determination module 420 may determine one or more suggested destination locations. Merely by way of example, the processor (e.g., the determination module 420 of the processing engine 112) may determine one or more historical destination locations with a selection probability greater than a preset probability as the one or more suggested destination locations. In some embodiments, the processor (e.g., the determination module 420 of the processing engine 112) may determine a suggested destination location. Merely by way of example, determination module 420 may determine a historical destination location with the greatest selection probability as the suggested destination location.

Further, the processor may output the suggested destination to the user. In some embodiments, the processor may determine the one or more historical destination locations with the selection probability larger than a preset value as the suggested destination location. When one or more historical destination locations with a selection probability greater than a preset probability are designated as the one or more suggested destination locations, the processor may output the one or more suggested destinations to the user. The user may then select one of the one or more suggested destinations. The processor may determine one with a largest selection probability among the one or more historical destination locations as the suggested destination location, if the one or more historical destination locations are more than one.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, process 500 may include one or more other operations. However, those variations and modifications also fall within the scope of the present disclosure.

Figure 5B:
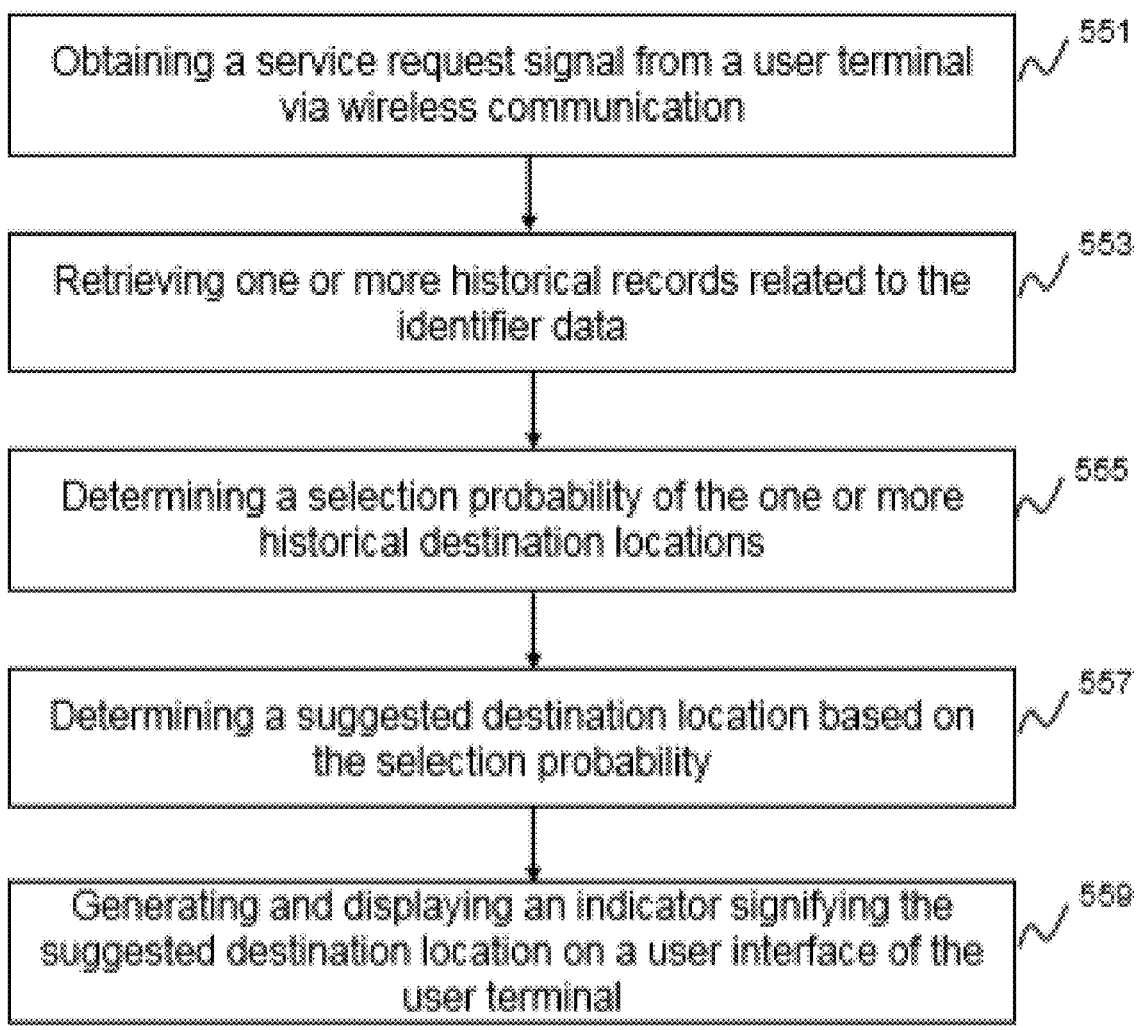

FIG. 5B is a flowchart illustrating an exemplary process for destination predicting according to some embodiments of the present disclosure. The process 550 may be executed by the online to offline service system 100. For example, the process 550 may be implemented as a set of instructions (e.g., an application) stored in the storage device 130. The processing engine 112 may execute the set of instructions and, when executing the instructions, it may be configured to perform the process 550. The operations of the illustrated process presented below are intended to be illustrative. In some embodiments, the process 550 may be accomplished with one or more additional operations not described and/or without one or more of the operations discussed. Additionally, the order in which the operations of the process as illustrated in FIG. 9 and described below is not intended to be limiting.

In 551, the processor (e.g., the acquisition module 410 of the processing engine 112) may obtain a service request signal sent from a user terminal via wireless communication. A service request, sent by a user via the user terminal, may relate to a destination location where the user may want to go from a first departure location at first departure time. In some embodiments, the user terminal may generate the service request by activating an APP (e.g., an online to offline travel service platform) installed in the user terminal. There may be various ways for the user to activate the APP. Merely by way of example, the user may activate the APP through a voice input, the user terminal may generate the service request based on the user's voice input. As another example, the user may activate the APP through a gesture input, the user terminal may generate the service request based on the user's gesture input. In some embodiments, after activating the APP (e.g., an online to offline travel service platform) installed in the user terminal, the user terminal may generate the service request by the user requesting the APP to execute a service reservation. For example, after activating the APP installed in the user terminal, the user terminal may generate the service request when the user clicking a service reservation button on the user interface. There may be various ways for the user to start the service reservation after activating the APP, e.g., a voice input, a gesture input, etc.

When the service request is generated by the user's activating an APP (e.g., an online to offline travel service platform) installed in the user terminal, the first departure time related to the service request may be a trigger time of the user activating the APP, and the first departure location related to the service request may be a current location of the user or the user terminal. For example, when a user wants to call a car, the user may perform a clicking operation to active the APP (e.g., an online to offline travel service platform) installed in the user terminal. The click operation may trigger the user terminal to generate a service request. After receiving the user's service request, the user terminal may obtain a trigger time of the service request through a clock program, and may designate the trigger time as the first departure time. The user terminal may also obtain a current location of the user through a Global Positioning System (also referred to as "GPS" in the present disclosure) on the user terminal, and may designate the current location as the first departure location.

When the service request is generated by the user requesting an APP (e.g., an online to offline travel service platform) to execute a service reservation after activating the APP installed in the user terminal, the service request may carry the information of the first departure location and/or the first departure time that is input by the user. In some embodiments, the user may only input information of a departure location related to the service request. The user terminal may then read the information of the departure location, and may designate the departure location input by the user as the first departure location. The first departure time related to the service request may be a trigger time of the user requesting the APP to execute the service reservation, and the trigger time may be obtained through a clock program in the user terminal. In some embodiments, the user may only input information of a departure time related to the service request. The user terminal may then read the information of the departure time, and may designate the departure time input by the user as the first departure time. The first departure location related to the service request may be a current location of the user or the user terminal, and the current location may be obtained through a GPS on the user terminal. In some embodiments, the user may input information of a departure location and a departure time related to the service request. The user terminal may read the information of the departure location and the departure time. The user terminal may then designate the departure location input by the user as the first departure location, and designate the departure time input by the user as the first departure time. A departure location as used in the present disclosure may be described by a name of the departure location, the latitude and longitude of the departure location, etc.

In some embodiments, the service request may include identifier data, a first departure location, and a first departure time. The service request may not include the destination location, and the processor (e.g., the determination module 420 of the processing engine 112) may determine one or more suggested destination locations for the user to select. The service request signal may encode the identifier data, the first departure location, and the first departure time. In some embodiments, the processor (e.g., acquisition module 410 of processing engine 112) may receive the service request including the identifier data, the first departure location, and the first departure time sent from the user terminal via wireless communication. Further, the processor may obtain travel information of the user related to the service request.

The identifier data included in the service request may be identity information corresponding to the user, and the processing engine 112 may identify the user based on the corresponding identifier data. The identifier data may be a character string randomly determined by the processing engine 112, and the character string may be a binary character string, an octal character string, a hexadecimal character string, etc. In some embodiments, the identifier data may include Internet Protocol (IP) address information of the user.

In 553, the processor (e.g., determination module 420 of the processing engine 112) may retrieve the one or more historical records related to the identifier data of the user. For example, the processor may retrieve one or more historical records that a historical departure time of the one or more historical records is the same as the first departure time related to the identifier data. As another example, the processor may retrieve one or more historical records that a historical departure location of the one or more historical records is the same as the first departure location related to the identifier data. As still another example, the processor may retrieve all historical records that belong to a same user determined based on the identifier data included in the service request.

A historical record may be a historical service request completed in the past. A historical service request may relate to a historical destination location where a user actually wants to go from a historical departure location at historical departure time. Thus, a historical record may at least include a historical departure location, a historical departure time, and a historical destination location. In some embodiments, each historical record may include identifier data for the processor to identify the user. Merely by way of example, the processor may randomly sample historical records of 1,000 users. After eliminating some historical records of invalid users, the processor may obtain historical records of 774 valid users. Table 1 shows exemplary historical records of some users.

TABLE 1

| Identifier Data | $F_p$ | $D_p$ | $T_p$ |
|---|---|---|---|
| 112429703 | World Trade International Apartment | Capital Airport Terminal 1 | 6 |
| 112429703 | Apple Community South District | The Place | 17 |
| 112429703 | Huangmuchang Road North Exit | Fortune Financial Center | 11 |
| 1.35521E+12 | Qing Cheng Ming Yuan (South District) | Bailiwei Logistics Second Branch | 9 |
| 1.35521E+12 | Jianwai SOHO (Eastern District) | Beijing Zoo (Northwest Gate) | 20 |
| 1.35521E+12 | Qing Cheng Ming Yuan (South District) | Beijing Transportation Vocational College | 8 |
| 1.35521E+12 | Qing Cheng Ming Yuan (South District) | Beijing Transportation Vocational College | 7 |
| 1.35521E+12 | Qing Cheng Ming Yuan (South District) | Beijing Transportation Vocational College | 7 |
| 929148 | Founder International Building | Huilong Ju | 14 |
| 929148 | UFIDA Software Park | Brilliant Times Building | 12 |
| 929148 | UFIDA Software Park | Brilliant Times Building | 12 |
| 929148 | UFIDA Software Park | Huoying Xiang | 19 |
| 1.4146E+12 | Near Beiguan (bus station) | Yingezhuang Village | 19 |
| 1.4146E+12 | Ximen Road North Bus Station | Yingezhuang Village | 12 |
| 1.4146E+12 | Yijia Home | Yingezhuang Village | 12 |
| 1.4146E+12 | Yingezhuang Brigade | Tongzhou Beiguan | 10 |

Table 1 may show the relationship between a historical departure location $F_p$, a historical destination location $D_p$, and a historical departure time $T_p$. Based on the historical records of these 774 users, the processor (e.g., determination module 420 of the processing engine 112) may determine mutual information (MI) of two variables (i.e., the historical destination location and the historical departure location, the historical destination location and the historical departure time, and the historical departure location and the historical departure time). The mutual information of two variables may be a measure of the mutual dependence between the two variables. For example, mutual information of the historical destination location and the historical departure location may be a measure of the mutual dependence between the historical destination location and the historical departure location. Table 2 shows exemplary mutual information of a historical destination location and a historical departure location, a historical destination location and a historical departure time, and a historical departure location and a historical departure time.

TABLE 2

| Identifier Data | $I(D_p, F_p)$ | $I(D_p, T_p)$ | $I(F_p, T_p)$ |
|---|---|---|---|
| 112429703 | 1.508884 | 2.027818 | 1.064218 |
| 1.35521E+12 | 0.500402 | 0.950271 | 0.500402 |
| 929148 | 0.717611 | 1.292038 | 1.061066 |
| 1.4146E+12 | 0.796312 | 0.796312 | 1.351784 |
| 109521243 | 1.074092 | 1.845729 | 1.112543 |
| 1.35805E+12 | 1.611297 | 2.004233 | 1.659781 |
| 141443260 | 0.10564 | 1.938507 | 0.10564 |
| 117919208 | 1.098612 | 1.098612 | 1.098612 |
| 100777906 | 0.851373 | 1.456864 | 0.780802 |
| 115615947 | 1.003353 | 1.179362 | 1.260151 |
| 1795650 | 0.661322 | 0.964548 | 0.926787 |
| 112169989 | 0.695981 | 0.902496 | 0.871515 |
| ... | ... | ... | ... |
| Mean Value | 1.02 | 1.23 | 0.9 |

$I(D_p, F_p)$ denotes mutual information of a historical destination location and a historical departure location. $I(D_p, T_p)$ denotes mutual information of a historical destination location and a historical departure time. $I(F_p, T_p)$ denotes mutual information of a historical departure location and a historical departure time. In some embodiments, a correlation may exist among the historical departure location, the historical departure time and the historical destination location. The historical departure location and the historical departure time may have a great influence on a prediction of the destination location of the user. Therefore, in some embodiments, a suggested destination location determined based on the one or more historical records may be closer to a true destination location related to the servicer request of the user.

In 555, a selection probability of the one or more historical destination locations may be determined using a pre-stored destination matching algorithm. In some embodiments, the processor (e.g., determination module 420 of the processing engine 112) may determine the selection probability of the one or more historical destination locations using a pre-stored destination matching algorithm.

In some embodiments, a determination of the selection probability of the one or more historical destination locations according to the service request and the one or more historical records corresponding to the user may actually be a determination of $P(D_m|F, T)$. $D_m$ denotes a mth historical destination location among the one or more historical records related to the identifier data. F denotes a first departure location in the user's service request. T denotes a first departure time in the user's service request. $P(D_m|F, T)$ denotes a selection probability of that a historical record includes the mth historical destination location given that a historical record includes the first departure location and the first departure time among the one or more historical records. Since the condition part is already a joint distribution of two variables, the Bayesian method may be directly used to derive the following equation:

$$P(D_m \mid F, T) = \frac{P(F, T \mid D_m) * P(D_m)}{\sum_{m=1}^{N} P(F, T \mid D_m) * P(D_m)}, \quad \text{Equation (1)}$$

where $1 \leq m \leq N$, and both N and m are integers. Through an equation transformation, the problem may be converted to how to determine $P(D_m|F, T)$. Based on different pre-stored destination matching algorithms, the processor may achieve the determination of $P(D_m|F, T)$ through various ways.

In some embodiments, the processor (e.g., determination module 420 of the processing engine 112) may determine the selection probability of the one or more historical destination locations in the one or more historical records corresponding to the identifier data of the user according to the following equation:

$$P(D_m \mid F, T) = \frac{P(F \mid D_m)P(T \mid D_m) * P(D_m)}{\sum_{m=1}^{N} P(F \mid D_m)P(F, T \mid D_m) * P(D_m)}. \quad \text{Equation (2)}$$

$D_m$ denotes a mth historical destination location among the one or more historical records of the user. F denotes the first departure location of the service request related to the identifier data. T denotes the first departure time of the service request related to the identifier data. $P(F|D_m)$ denotes a first posterior probability of that a historical departure location is the first departure location given that a historical record includes the mth historical destination location among the one or more historical records. $P(T|D_m)$ denotes a second posterior probability of that a historical departure time is the first departure time given that a historical record includes the mth historical destination location among the one or more historical records. $P(D_m)$ denotes a prior probability of going to the mth historical destination location among the one or more historical records. N denotes a total number of historical destination locations among the one or more historical records corresponding to the identifier data of the user, where $1 \leq m \leq N$, and both N and m are integers.

In some embodiments, according to the Naive Bayes method (Naïve Bayes), $P(F, T)$ may be close to $P(T)P(F)$, and $P(F, T|D_m) \approx (T|D_m)P(F|D_m)$ may then be achieved. Equation (2) may be obtained by replacing the $P(F, T|D_m)$ with $P(T|D_m)P(F|D_m)$ in Equation (1).

In Equation (2), $P(D_m)$ denotes a prior probability of going to the mth historical destination location among the one or more historical records corresponding to the identifier data of the use, which may be determined by the processor employing a frequency statistics method. Specifically, the processor (e.g., determination module 420 of the processing engine 112) may count a total number of historical destination locations in the one or more historical records related to the identifier data. The processor may count a total times of the user of going to the mth historical destination location. The processor may then achieve the prior probability $P(D_m)$ by dividing the total times of the user of going to the mth historical destination location by the total number of historical destination locations among the one or more historical records.

$P(T|D_m)$ denotes the second posterior probability of that a historical departure time is the first departure time given that a historical record includes the mth historical destination location among the one or more historical records. In some embodiments, the processor (e.g., determination module 420 of the processing engine 112) may determine the second posterior probability $P(T|D_m)$ employing a frequency statistics method. Specifically, among the one or more historical records related to the identifier data, the processor may count a number of all historical records with a historical departure time same as the first departure time in the service request given that a historical record includes the mth historical destination location. The processor may also count a total number of all historical departure times given that a historical record includes the mth historical destination location. The processor may then determine the second posterior probability $P(T|D_m)$ by dividing the number of all historical records with a historical departure time, which is the same as the first departure time, by the total number of all historical departure times. For example, assume that the mth historical destination location is Tiantongyuan East District 1, and the total number of all historical departure times given that the corresponding historical record includes Tiantongyuan East District 1 are once at 9:00, once at 13:00, twice at 15:00, twice at 16:00, 4 times at 18:00, 3 times at 19:00, 5 times at 20:00, 10 times at 21:00, 7 times at 22:00, 6 times at 23:00, 4 times at 0:00, twice at 1:00, and 3 times at 2:00. The first departure time in the service request may be 20:00. Under this situation, the processor may achieve the second posterior probability $$P(T|D_m) = \frac{5}{(1+1+2+2+4+3+5+10+7+6+4+2+3)} = 0.1.$$

In some embodiments, the processor (e.g., determination module 420 of the processing engine 112) may determine a characteristic distribution of all historical departure times in the one or more historical records related to the identifier data given that a historical record includes the mth historical destination location in advance. The processor may then determine the second posterior probability $P(T|D_m)$ based on the characteristic distribution of all historical departure times. Table 3 shows exemplary historical records given that Tiantongyuan East District 1 is the mth historical destination location in the one or more historical records related to the identifier data. $Flat_p$ denotes the latitude of a historical departure location. $Flng_p$ denotes the longitude of the historical departure location. As shown in Table 3, $Flat_p$ and $Flng_p$ denotes the latitude and longitude of Tiantongyuan East District 1.

TABLE 3

| Identifier Data | $D_p$ | $T_p$ | $Flat_p$ | $Flng_p$ |
|---|---|---|---|---|
| 26212581 | Tiantongyuan East District 1 | 16 | 40.105202 | 116.633579 |
| 26212581 | Tiantongyuan East District 1 | 16 | 40.105201 | 116.633579 |
| 26212581 | Tiantongyuan East District 1 | 23 | 40.085353 | 116.427548 |
| 26212581 | Tiantongyuan East District 1 | 22 | 40.085353 | 116.427548 |
| 26212581 | Tiantongyuan East District 1 | 22 | 40.085352 | 116.427548 |
| 26212581 | Tiantongyuan East District 1 | 21 | 40.105351 | 116.63357 |
| 26212581 | Tiantongyuan East District 1 | 19 | 39.93366 | 116.45789 |
| 26212581 | Tiantongyuan East District 1 | 0 | 39.93366 | 116.45789 |
| 26212581 | Tiantongyuan East District 1 | 0 | 39.93366 | 116.45962 |
| 26212581 | Tiantongyuan East District 1 | 19 | 40.105351 | 116.63357 |
| 26212581 | Tiantongyuan East District 1 | 18 | 39.93366 | 116.45528 |
| 26212581 | Tiantongyuan East District 1 | 18 | 39.937705 | 116.455128 |
| 26212581 | Tiantongyuan East District 1 | 2 | 40.105351 | 116.63357 |
| 26212581 | Tiantongyuan East District 1 | 16 | 39.98832 | 116.4819 |
| 26212581 | Tiantongyuan East District 1 | 18 | 40.10535 | 116.6335 |
| 26212581 | Tiantongyuan East District 1 | 20 | 40.10535 | 116.6335 |
| 26212581 | Tiantongyuan East District 1 | 22 | 39.928561 | 116.58957 |
| 26212581 | Tiantongyuan East District 1 | 15 | 40.10535 | 116.6335 |
| 26212581 | Tiantongyuan East District 1 | 23 | 40.10535 | 116.6335 |
| 26212581 | Tiantongyuan East District 1 | 23 | 39.937704 | 116.455128 |
| 26212581 | Tiantongyuan East District 1 | 23 | 39.937705 | 116.455128 |
| 26212581 | Tiantongyuan East District 1 | 20 | 40.10535 | 116.6335 |
| 26212581 | Tiantongyuan East District 1 | 20 | 40.06862 | 116.533291 |
| 26212581 | Tiantongyuan East District 1 | 20 | 40.088789 | 116.537099 |
| 26212581 | Tiantongyuan East District 1 | 16 | 39.954069 | 116.2323 |
| 26212581 | Tiantongyuan East District 1 | 20 | 40.098991 | 116.63482 |
| 26212581 | Tiantongyuan East District 1 | 21 | 40.10535 | 116.6335 |
| 26212581 | Tiantongyuan East District 1 | 22 | 40.10535 | 116.6335 |
| 26212581 | Tiantongyuan East District 1 | 16 | 39.880966 | 116.39817 |
| 26212581 | Tiantongyuan East District 1 | 19 | 40.10535 | 116.6335 |
| 26212581 | Tiantongyuan East District 1 | 20 | 40.10535 | 116.6335 |
| 26212581 | Tiantongyuan East District 1 | 21 | 40.08846 | 116.53607 |
| 26212581 | Tiantongyuan East District 1 | 21 | 40.08923 | 116.537363 |
| 26212581 | Tiantongyuan East District 1 | 18 | 40.10535 | 116.6335 |
| 26212581 | Tiantongyuan East District 1 | 1 | 39.93366 | 116.4582 |
| 26212581 | Tiantongyuan East District 1 | 23 | 39.987297 | 116.424414 |
| 26212581 | Tiantongyuan East District 1 | 3 | 40.10535 | 116.6335 |
| 26212581 | Tiantongyuan East District 1 | 0 | 39.93366 | 116.457901 |
| 26212581 | Tiantongyuan East District 1 | 1 | 40.10535 | 116.6335 |
| 26212581 | Tiantongyuan East District 1 | 15 | 39.93367 | 116.459976 |
| 26212581 | Tiantongyuan East District 1 | 19 | 39.980519 | 116.485551 |

TABLE 3-continued

| Identifier Data | $D_p$ | $T_p$ | $Flat_p$ | $Flng_p$ |
|---|---|---|---|---|
| 26212581 | Tiantongyuan East District 1 | 0 | 39.933628 | 116.458405 |
| 26212581 | Tiantongyuan East District 1 | 21 | 40.10535 | 116.6335 |
| 26212581 | Tiantongyuan East District 1 | 22 | 39.960379 | 116.485761 |
| 26212581 | Tiantongyuan East District 1 | 15 | 40.10535 | 116.6335 |
| 26212581 | Tiantongyuan East District 1 | 2 | 40.10535 | 116.6335 |
| 26212581 | Tiantongyuan East District 1 | 23 | 40.105341 | 116.63347 |
| 26212581 | Tiantongyuan East District 1 | 18 | 40.105341 | 116.63349 |
| 26212581 | Tiantongyuan East District 1 | 21 | 39.93212 | 116.456934 |
| 26212581 | Tiantongyuan East District 1 | 21 | 39.932191 | 116.456858 |
| 26212581 | Tiantongyuan East District 1 | 22 | 39.95001 | 116.47187 |
| 26212581 | Tiantongyuan East District 1 | 21 | 39.949649 | 116.47198 |
| 26212581 | Tiantongyuan East District 1 | 2 | 39.93343 | 116.45884 |
| 26212581 | Tiantongyuan East District 1 | 22 | 39.935779 | 116.473571 |
| 26212581 | Tiantongyuan East District 1 | 21 | 39.935779 | 116.473571 |

Figure 6:
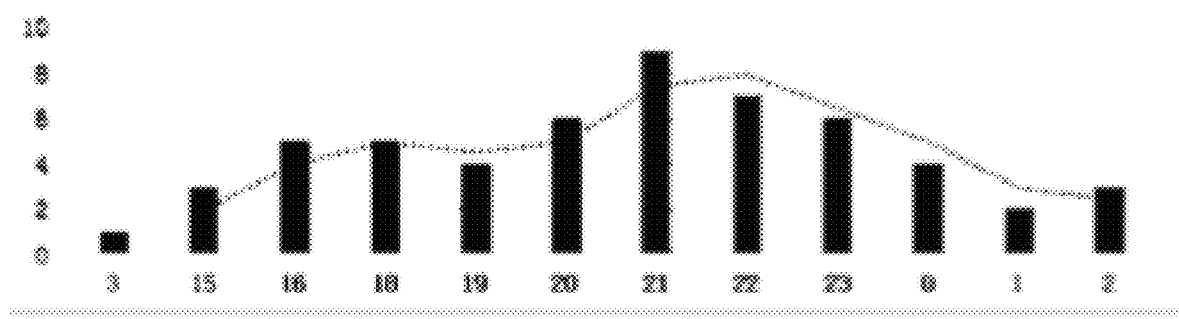
FIG. 6 is an exemplary frequency distribution diagram of historical departure times plotted according to Table 3.

FIG. 6 is an exemplary frequency distribution diagram of historical departure times plotted according to Table 3 given that a historical record includes the mth destination location. As shown in FIG. 6, with a fixed destination location (e.g., Tiantongyuan East District 1), the historical departure times may be approximately subject to a normal distribution. The processor (e.g., determination module 420 of the processing engine 112) may determine the mean value and variance of the historical departure times according to each historical departure time in the one or more historical records given that a historical record includes the mth destination location. The processor may determine a probability density function of the historical departure times with a fixed destination location (e.g. the mth historical destination location). Further, the processor may determine the second posterior probability $P(T|D_m)$ based on the first departure time in the service request and the probability density function.

There may be various manners for describing a departure location. Based on different description manners, the processor (e.g., determination module 420 of the processing engine 112) may determine the first posterior probability $P(F|D_m)$ employing different methods. In some embodiments, a departure location may be described by the name of the departure location, the processor may determine the first posterior probability $P(F|D_m)$ employing a frequency statistics method. For example, among the one or more historical records related to the identifier data, the processor may count a number of all historical records with a historical departure location same as the first departure location in the service request given that a historical record includes the mth historical destination location. The processor may also count a total number of all historical departure locations given that a historical record includes the mth historical destination location. The processor may then determine the first posterior probability $P(F|D_m)$ by dividing the number of all historical records with a historical departure location same as the first departure location by the total number of all historical departure locations.

In some embodiments, a departure location may be described by the latitude and longitude of the departure location, the processor (e.g., determination module 420 of the processing engine 112) may determine the first posterior probability $P(F|D_m)$ employing the frequency statistics method. In some embodiments, the processor may determine a characteristic distribution of the longitudes and latitudes of historical departure locations given that a historical record includes the mth historical destination location. The processor may then determine the first posterior probability $P(F|D_m)$ based on the characteristic distribution of the longitudes and latitudes of historical departure locations. Table 4 shows exemplary longitudes and latitudes of the historical departure locations in the one or more historical records related to the identifier data given that a historical destination in a historical record is National Art Museum of China.

TABLE 4

| Identifier Data | $D_p$ | $Flat_p$, $Flng_p$ |
|---|---|---|
| 103194704 | National Art Museum of China | 39.915524; 116.363868, 39.915524; 116.3638, 39.9229; 116.341193, 39.922947; 116.34133, 39.922956; 116.341614, 39.922952; 116.341514, 39.922947; 116.341308, 39.922947; 116.341248, 39.922764; 116.341161, 39.922943; 116.341056, 39.922947; . . . |

The processor (e.g., determination module 420 of the processing engine 112) may determine the mean value of the latitudes and the longitudes of the historical departure locations, respectively. A location with the longitude and latitude corresponding to the mean value may be designated as a center point. Table 5 shows exemplary deviation distances from the historical departure locations to the center point, and the frequency of each historical departure location, given that a historical record includes the mth historical destination location (e.g., National Art Museum of China).

TABLE 5

| $Flat_p$, $Flng_p$ | Deviation Distance | Frequency |
|---|---|---|
| 39.912, 116.473 | 10279 | 1 |
| 39.914, 116.474 | 9902 | 1 |
| 39.963, 116.49 | 2220 | 1 |
| 39.988, 116.492 | 4303 | 1 |
| 39.924, 116.503 | 6920 | 3 |
| 39.965, 116.5 | 506 | 4 |
| 39.964, 116.503 | 168 | 9 |
| 39.965, 116.503 | 0 | 24 |
| 39.966, 116.503 | 168 | 16 |
| 39.964, 116.504 | 238 | 2 |
| 39.965, 116.504 | 168 | 1 |

TABLE 5-continued

| $Flat_p$, $Flng_p$ | Deviation Distance | Frequency |
|---|---|---|
| 39.966, 116.505 | 377 | 1 |
| 39.958, 116.507 | 1360 | 1 |
| 39.919, 116.522 | 8400 | 1 |

As shown in Table 5, the longitudes and latitudes of the historical departure locations may be subject to a two-dimensional normal distribution given that a historical record includes the mth historical destination location (e.g., National Art Museum of China). The longitude and latitude (X, Y) of a departure location related to the same identifier data given that a historical record includes the mth historical destination location may be subject to a two-dimensional normal distribution with parameters (μ1, μ2, σ1, σ2, ρ), i.e., (X, Y)~(μ1, μ2, σ1, σ2, ρ). The processor (e.g., determination module 420 of the processing engine 112) may derive a probability density function as follows:

$$p(x, y) = \frac{1}{2\pi\sigma_1\sigma_2\sqrt{1-\rho^2}} \exp\left\{\frac{-1}{2(1-\rho^2)}\left[\frac{(x-\mu1)^2}{\sigma_1^2} - 2\rho\frac{(x-\mu1)(y-\mu2)}{\sigma_1\sigma_2} + \frac{(y-\mu2)^2}{\sigma_2^2}\right]\right\}. \quad \text{Equation (3)}$$

The processor may determine the mean value and variance of the longitudes and latitudes, and the parameter ρ based on the latitude and longitude of each historical departure location given that a historical record includes the mth destination location. The processor may then determine the probability density function according to Equation (3). Further, the processor may determine the first posterior probability P(F|$D_m$) based on the longitude and latitude of the first departure location in the service request and the probability density function. Table 6 shows the mean value and variance of the longitudes and latitudes of historical departure locations and a parameter ρ in historical records of some users given that a historical record includes the mth destination location.

destination locations in the one or more historical records corresponding to the identifier data of the user according to the following equation:

$$P(D_m | F, T) = \frac{P(T | F, D_m)P(T | D_m) * P(D_m)}{\sum_{m=1}^{N} P(T | F, D_m)P(T | D_m) * P(D_m)}. \quad \text{Equation (4)}$$

$D_m$ denotes a mth historical destination location among the one or more historical records of the user. F denotes the first departure location of the service request related to the identifier data. T denotes the first departure time of the service request related to the identifier data. P(T|F, $D_m$) denotes a third posterior probability that a historical departure time is the first departure time given that a historical record includes the mth historical destination location and the first departure location among the one or more historical records. P(F|$D_m$) denotes a first posterior probability of that a historical departure location is the first departure location given that a historical record includes the mth historical destination location among the one or more historical records. P($D_m$) denotes a prior probability of going to the mth historical destination location among the one or more historical records. N denotes a total number of historical destination locations among the one or more historical records corresponding to the identifier data of the user, where 1≤m≤N, and both N and m are integers.

In some embodiments, according to the Bayes method, there may be a strong correlation between a departure time and a departure location. When a departure location is described by a name of the departure location, and the determination method of P($D_m$) and P(F|$D_m$) may be the same as those in the previous embodiment, which will not be described herein. Herein, it is important to determine the third posterior probability P(T|F, $D_m$). In some embodiments, the processor (e.g., determination module 420 of the processing engine 112) may determine the third posterior probability P(T|F, $D_m$) employing a frequency statistics method. Specifically, the processor may count a number of

TABLE 6

| Identifier Data | $D_p$ | Frequency | μ1 | μ2 | σ1 | σ2 | ρ |
|---|---|---|---|---|---|---|---|
| 1E+08 | National Art Museum of China | 41 | 39.92311 | 116.3669 | 0.021207 | 0.041507 | 0.934128 |
| 951556 | Huaye Oriental Rose | 36 | 39.92788 | 116.4858 | 0.045401 | 0.104788 | −0.23951 |
| 1E+08 | Cui Gezhuang Police Station | 36 | 39.98256 | 116.4465 | 0.02068 | 0.031229 | 0.653838 |
| 2.2E+12 | Xiaoxinzhai Bridge | 35 | 40.14912 | 117.1343 | 0.005918 | 0.002506 | 0.974456 |
| 1E+08 | Life Building | 33 | 40.0393 | 116.3192 | 0.000416 | 0.000303 | −0.92146 |
| 153054 | Infinity International Finance Center | 33 | 39.79568 | 116.3433 | 0.007273 | 0.009031 | −0.9994 |

In summary, for each historical destination location, based on the prior probability P($D_m$), the first posterior probability P(F|$D_m$), and the second posterior probability P(T|$D_m$), the processor may determine the selection probability P($D_m$|F, T) employing different methods as described above.

In some embodiments, the processor (e.g., determination module 420 of the processing engine 112) may determine the selection probability of the one or more historical historical departure times that are the same as the first departure time in the service request given that a historical record includes the mth historical destination location and the first departure location. The processor may also count a total number of historical departure times given that a historical record includes the mth historical destination location and the first departure location. The processor may then determine the third posterior probability P(T|F, $D_m$) by dividing the number of historical departure times that are same as the first departure time in the service request by the total number of all historical departure times given that a historical record includes the mth historical destination location and the first departure location.

In some embodiments, the processor (e.g., determination module 420 of the processing engine 112) may determine a characteristic distribution of historical departure times given that a historical record includes the mth historical destination location and the first departure location. The processor may then determine the third posterior probability $P(T|F, D_m)$ based on the characteristic distribution. Table 7 shows exemplary historical departure times given that a historical record includes a fixed historical destination location and a fixed historical departure location.

TABLE 7

| $F_p$ | $D_p$ | $T_p$ |
|---|---|---|
| Haozhuang Home South District | Intersection of Fengxian East Road and Yongjia North Road | 8; 8; 8; 8; 8; 8; 8; 8; 7 |
| Haozhuang Home South District | Yongfeng Industrial Base | 8; 14; 7; 12; 8; 8; 9 |
| Intersection of Fengxian East Road and Yongjia North Road | Haozhuang Home South District | 19; 19; 19; 15; 18; 18; 22; 19; 19; 18; 19; 19; 14; 17; 17; 20; 17; 12; 18 |
| Yuetan North Street Building 9 | Yongfeng Industrial Base | 13; 15; 15 |
| Yuetan North Street Building 7 | Haozhuang Home South District | 19; 19; 21; 21 |
| Yongfeng Industrial Base | Haozhuang Home South District | 17; 18; 19 |
| Haozhuang Home South District | Yuetan North Street | 7; 7; 11; 7; 8; 7; 10; 7; 7 |

As shown in Table 7, the historical departure times may be approximately subject to a normal distribution given that a historical record includes a fixed historical destination location and a fixed historical departure location. The processor (e.g., determination module 420 of the processing engine 112) may determine the mean value and variance of historical departure times given that a historical record includes the mth historical destination location and the first departure location. The processor may then determine a probability density function of the first departure time. Further, the processor may determine the third posterior probability $P(T|F, D_m)$ based on the probability density function and the first departure time in the service request.

In some embodiments, the processor (e.g., determination module 420 of the processing engine 112) may determine the selection probability of the one or more historical destination locations in the one or more historical records corresponding to the identifier data of the user according to the following equation:

$$P(D_m \mid F, T) = \frac{\frac{1}{(2\pi)^{3/2}} \frac{1}{\sqrt{\det C}} \exp\left[-\frac{1}{2}(X-\mu)^T C^{-1}(X-\mu)\right] * P(D_m)}{\sum_{m=1}^{N} \frac{1}{(2\pi)^{3/2}} \frac{1}{\sqrt{\det C}} \exp\left[-\frac{1}{2}(X-\mu)^T C^{-1}(X-\mu)\right] * P(D_m)},$$

Equation (5)

$D_m$ denotes a mth historical destination location among the one or more historical records of the user. F denotes the first departure location of the service request related to the identifier data. T denotes the first departure time of the service request related to the identifier data. In Equation (5), $$X = (T, \text{Flat}, \text{Flng}^T), \mu = (E\{T_p\}, E\{\text{Flat}_p\}, E\{\text{Flng}_p\})^T,$$

$$C = \begin{bmatrix} c_{11} & c_{12} & c_{13} \\ c_{21} & c_{22} & c_{23} \\ c_{31} & c_{32} & c_{33} \end{bmatrix}, c_{ij} = Cov(x_i, x_j) = E\{[x_i - \mu_i][x_j - \mu_j]\},$$

$$x_1 = T_p, x_2 = \text{Flat}_p, x_3 = \text{Flng}_p,$$

where Flat denotes the latitude of the first departure location in the service request, Flng denotes the longitude of the first departure location in the service request, $T_p$ denotes a historical departure time, $\text{Flat}_p$ denotes the latitude of a historical departure location, $\text{Flng}_p$ denotes the longitude of the historical departure location.

When a departure location is described by the latitude and longitude of the departure location, based on the determination of the selection probability $P(D_m|F, T)$ according to Equation (2), the second posterior probability $P(T|D_m)$ may be close to $N(\mu, \sigma)$, and $P(\text{Flat}, \text{Flng}|D_m)\sim N(\mu_1, \mu_2, \sigma_1^2, \sigma_2^2, \rho)$ may be derived. Assuming $P(\text{Flat}, \text{Flng}, T|D_m)\sim N_3(\mu, C)$, $P(\text{Flat}, \text{Flng}, T|D_m)$ may be subject to a three-ary normal distribution and may be derived as the following equation:

$$P(\text{Flat}, \text{Flng}, T \mid D_m) =$$

$$P(X \mid D_m) = \frac{1}{(2\pi)^{3/2}} \frac{1}{\sqrt{\det C}} \exp\left[-\frac{1}{2}(X-\mu)^T C^-(X-\mu)\right].$$

Equation (6)

Centralized tendency matrix $\mu$ is equal to $(E\{T_p\}, E\{\text{Flat}_p\}, E\{\text{Flng}_p\})^T$. $E\{T_p\}$ denotes a mean value of historical departure times in the one or more historical records related to the identifier data. $E\{\text{Flat}_p\}$ denotes a mean value of the latitudes of historical departure locations in the one or more historical records related to the identifier data. $E\{\text{Flng}_p\}$ denotes a mean value of the longitudes of the historical departure locations in the one or more historical records related to the identifier data. C may be a covariance matrix of the latitude of a historical departure location, the longitude of the historical departure location, and the corresponding historical departure time. The processor may determine the centralized tendency matrix $\mu$ and the covariance matrix C based on the one or more historical records related to the identifier data. Further, the processor may determine the selection probability $P(D_m|F, T)$ according to Equation (6).

For example, the processor may determine the centralized tendency matrix $\mu$ and the covariance matrix C of the historical departure location, the historical destination location, and the corresponding historical departure time according to Table 3.

$$\mu = \begin{bmatrix} 20.35 \\ 40.028 \\ 116.534 \end{bmatrix},$$

$$C = \begin{bmatrix} 1.43414141e+01 & -5.29556407e-02? & -5.22035906e-02 \\ -5.29556407e-02 & 6.63847604e-03 & 6.08965387e-03 \\ -5.22035906e-02 & 6.08965387e-03 & 9.09750208e-03 \end{bmatrix},$$

$$\det C = |C| = 0.000324359553166,$$

$$C^{-1} = \begin{bmatrix} 7.18636621e-02 & 5.05187077e-01 & 7.42101242e-02 \\ 5.05187077e-01 & 3.93840196e+02 & -2.60728481e+02 \\ 7.42101242e-02 & -2.60728481e+02 & 2.84871629e+02 \end{bmatrix}$$

may be achieved. Bring the above values into Equation (6), and expand the Equation (6), the following equation may be achieved:

$$P(\text{Flat}, Flng, T \mid D_m) = P(X \mid D_m) = \qquad \text{Equation (7)}$$

$$\frac{1}{(2\pi)^{3/2}} \frac{1}{\sqrt{0.000324}} \exp\left[\sum_{i,j=1}^{3} c_{ij}^{-1}(x_i - \mu_i)(x_j - \mu_j)\right],$$

is an algebraic cofactor of C.

In some embodiments, the processor (e.g., determination module 420 of the processing engine 112) may determine the selection probability of the one or more historical destination locations in the one or more historical records corresponding to the identifier data of the user according to the following equation:

$$P(Y = D_m \mid F, T) = \frac{1}{1 + \exp(X^T A X + \theta^T X + b)}, \quad \text{Equation (8)}$$

$D_m$ denotes a mth historical destination location among the one or more historical records of the user. F denotes the first departure location of the service request related to the identifier data. T denotes the first departure time of the service request related to the identifier data. In Equation (8), $$(T, \text{Flat}, Flng)^T, \; b = -\frac{1}{2}\left(\mu^T C^{-1}\mu - \mu'^T C'^{-1}\mu'\right) + k,$$

$$k = \ln\left(\frac{1 - P(Y = D_m)}{P(Y = D_m)} \times \sqrt{\frac{|C'|}{|C|}}\right),$$

$$A = -\frac{1}{2}(C^{-1} - C'^{-1}), \text{ and } \theta^T = (\mu^T C^{-1} - \mu'^T C'^{-1}),$$

where $\mu$ is an expectation vector of X under the condition of $Y=D_m$, $\mu'$ is an expectation vector of X under the condition of $Y \neq D_m$, C is a covariance matrix of X under the condition of $Y=D_m$, C' is a covariance matrix of X under the condition of $Y \neq D_m$, Flat denotes the latitude of the first departure location in the service request, Flng denotes the longitude of the first departure location in the service request. Y denotes a destination location variable, and the range of the destination location variable may be all historical destination locations in the one or more historical records related to the identifier data.

When a departure location is described by the longitude and latitude of the departure location, the processor may determine the selection probability $P(D_m|F, T)$ employing a method of logistic regression. Based on Equation (6), the processor may derive an equation as follows:

$$P(\text{Flat}, Flng, T \mid D_m) = P(X \mid D_m) = \qquad \text{Equation (9)}$$

$$\frac{1}{(2\pi)^{n/2}} \frac{1}{\sqrt{\det C}} \exp\left[-\frac{1}{2}(X-\mu)^T C^{-1}(X-\mu)\right].$$

When n in Equation (9) is equal to 3, Equation (9) may be the same as Equation (6), and the definition of other parameters in Equation (9) may be the same as the definition in Equation (6).

$D_m$ denotes a mth historical destination location among the one or more historical records of the user. Y denotes a destination location variable, and the range of the destination location variable may be all historical destination locations in the one or more historical records related to the identifier data. Under the condition of $Y=D_m$ and $Y \neq D_m$, the processor may convert Equation (9) into two equations as follows:

$$\begin{cases} P(X \mid Y = D_m) = \frac{1}{(2\pi)^{n/2}} \\ \frac{1}{\sqrt{|C|}} \exp\left[-\frac{1}{2}(X-\mu)^T C^{-1}(X-\mu)\right] \\ P(X \mid Y \neq D_m) = \frac{1}{(2\pi)^{n/2}} \frac{1}{\sqrt{|C'|}} \exp \\ \left[-\frac{1}{2}(X-\mu')^T C'^{-1}(X-\mu')\right] \end{cases}, \quad \text{Equation (10)}$$

where $\mu$ is an expectation vector of X under the condition of $Y=D_m$, $\mu'$ is an expectation vector of X under the condition of $Y \neq D_m$, C is a covariance matrix of X under the condition of $Y=D_m$, and C' is a covariance matrix of X under the condition of $Y \neq D_m$.

The processor may perform Bayesian transformation on $P(Y=D_m|X)$, which may result in:

$$P(Y = D_m \mid X) = \frac{\left(\int P(X \mid Y = D_m) dx\right) P(Y = D_m)}{\left(\int P(X \mid Y = D_m) dx\right) P(Y = D_m) + \left(\int P(X \mid Y \neq D_m) dx\right) P(Y \neq D_m)} \approx \quad \text{Equation (11)}$$

$$\frac{P(X \mid Y = D_m) P(Y = D_m)}{P(X \mid Y = D_m) P(Y = D_m) + P(X \mid Y \neq D_m) P(Y \neq D_m)} =$$

$$\frac{1}{1 + \frac{1 - P(Y = D_m)}{P(Y = D_m)} \times \frac{P(X \mid Y \neq D_m)}{P(X \mid Y = D_m)}}.$$

Furthermore, $$\frac{P(X \mid Y \neq D_m)}{P(X \mid Y = D_m)} = \frac{\frac{1}{(2\pi)^{n/2}} \frac{1}{\sqrt{|C|}} \exp\left[-\frac{1}{2}(X-\mu)^T C^{-1}(X-\mu)\right]}{\frac{1}{(2\pi)^{n/2}} \frac{1}{\sqrt{|C'|}} \exp\left[-\frac{1}{2}(X-\mu')^T C'^{-1}(X-\mu')\right]} =$$

-continued $$\sqrt{\frac{|C'|}{|C|}} \exp\left\{-\frac{1}{2}[(X-\mu)^T C^{-1}(X-\mu) - (X-\mu')^T C'^{-1}(X-\mu')]\right\},$$

where $(X-\mu)^T C^{-1}(X-\mu) = (X^T - \mu^T)C^{-1}(X-\mu) = X^T C^{-1} X - X^T C^{-1}\mu - \mu^T C^{-1} X + \mu^T C^{-1}\mu = X^T C^{-1} X - 2\mu^T C^{-1} X + \mu^T C^{-1}\mu$. The above process uses $(X^T C^{-1}\mu)^T = X^T C^{-1}\mu$ and $(C^{-1})^T = C^{-1}$, $[(X-\mu)^T C^{-1}(X-\mu) - (X-\mu')^T C'^{-1}(X-\mu')] = X^T(C^{-1} - C'^{-1})X - 2(\mu^T C^{-1} - \mu'^T C'^{-1})X + (\mu^T C^{-1}\mu - \mu'^T C'^{-1}\mu')$ may then be achieved. Substituting $[(X-\mu)^T C^{-1}(X-\mu) - (X-\mu')^T C'^{-1}(X-\mu')] = X^T(C^{-1} - C'^{-1})X - 2(\mu^T C^{-1} - \mu'^T C'^{-1})X + (\mu^T C^{-1}\mu - \mu'^T C'^{-1}\mu')$ into Equation 11, the processor may derive $P(Y=D_m|X)$ as follows:

$$P(Y = D_m \mid X) = \frac{1}{1 + \frac{1 - P(Y = D_m)}{P(Y = D_m)} \times \frac{P(X \mid Y \neq D_m)}{P(X \mid Y = D_m)}}$$

$$= \frac{1}{1 + \frac{1 - P(Y = D_m)}{P(Y = D_m)} \times \sqrt{\frac{|C'|}{|C|}} \exp\left\{-\frac{1}{2}[(X-\mu)^T C^{-1}(X-\mu) - (X-\mu')^T C'^{-1}(X-\mu')]\right\}}$$

$$= \frac{1}{1 + \frac{1 - P(Y = D_m)}{P(Y = D_m)} \times \sqrt{\frac{|C'|}{|C|}} \exp\left\{-\frac{1}{2}[X^T(C^{-1} - C'^{-1})X - 2(\mu^T C^{-1} - \mu'^T C'^{-1})X + (\mu^T C^{-1}\mu - \mu'^T C'^{-1}\mu')]\right\}}$$

$$= \frac{1}{1 + \exp\left\{-\frac{1}{2}[X^T(C^{-1} - C'^{-1})X - 2(\mu^T C^{-1} - \mu'^T C'^{-1})X + (\mu^T C^{-1}\mu - \mu'^T C'^{-1}\mu')] + k\right\}} = \frac{1}{1 + \exp(X^T A X + \theta^T X + b)},$$

thus, Equation (8) may be achieved.

According to Equation (8), the processor may not need to determine a probability density function. Therefore, compared to other embodiments of the present disclosure, the determination of the selection probability according to Equation 8 may be faster and the efficiency may be improved.

It should be noted that the above descriptions of the selection probability $P(D_m|F, T)$ determination are provided for the purposes of illustration, and not intended to limit the scope of the present disclosure. For persons having ordinary skills in the art, various modifications and changes in the forms and details of the application of the above method and system may occur without departing from the principles of the present disclosure.

In 557, a suggested destination location that is the same as the one or more historical destination locations may be determined based on the selection probability. In some embodiments, the processor (e.g., determination module 420 of the processing engine 112) may determine the suggested destination location that is the same as the one or more historical destination locations based on the selection probability.

In some embodiments, the processor may determine one or more suggested destination locations. Merely by way of example, the processor may determine one or more historical destination locations with a selection probability greater than a preset probability as the one or more suggested destination locations.

In some embodiments, the processor may determine a suggested destination location. Merely by way of example, the processor may determine a historical destination location with the greatest selection probability as the suggested destination location.

In 559, an indicator signifying the suggested destination location may be generated and displayed on a user interface of the user terminal. In some embodiments, the processor (e.g., output module 430 of the processing engine 112) may generate and display the indicator signifying the suggested destination location on a user interface of the user terminal. The indicator may include the name of the suggested destination location, the latitude and longitude of the suggested destination location, an icon shown on a map of the travel service platform at the suggested destination location, etc. Detailed descriptions may be found in FIGS. 7-9, and descriptions thereof. In some embodiments, the processor may recommend the suggested destination location to the user through a voice playback manner. The output manner may be set by the user in advance, or may be determined by the user terminal.

It should be noted that the above descriptions of process 550 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, process 550 may include one or more other operations. However, those variations and modifications also fall within the scope of the present disclosure.

In some embodiments, in order to improve the efficiency of determining the suggested destination location, operation 553 may include filtering the one or more historical records according to the service request including the identifier data, only historical record(s) matched with the service request may be retrieved. In some embodiments, the historical record(s) matched with the service request may be a historical record with a high frequency historical destination location on the premise of leaving the first departure location at the first departure time. According to the service request and the one or more filtered historical records related to the identifier data, the pre-stored destination matching algorithm may then be used to determine a selection probability of the one or more historical destination locations in the one or more filtered historical records. Because the one or more historical records matched with the service request is filtered in advance, when calculating the selection probability of the one or more historical destination locations in the one or more filtered historical records, the amount of data may be smaller and the calculation efficiency may be higher.

In some embodiments, after operation 559, process 550 may further include determining a true destination location of the user. The user may perform operations related to the true destination location on the user interface. The user's operation may include selecting a suggested destination location, canceling the suggested destination location, and entering the true destination location. In practice, the suggested destination location output in operation 559 may not be the true needs of the user. The user may cancel the suggested destination location and input the true destination location. When the user selects a suggested destination location, the selected suggested destination location may be determined as the true destination location.

In some embodiments, in order to keep historical records updating according to the user's true needs, after determining the user's true destination location, process 550 may also include updating the historical records according to the first departure time, the first departure location, and the true destination location of the service request related to the identifier data. The updating process may be that the user terminal may send the user's travel information (the first departure time, the first departure location, and the true destination location) to the server, so that the server may store the travel information for updating the user's historical records.

Figure 7:
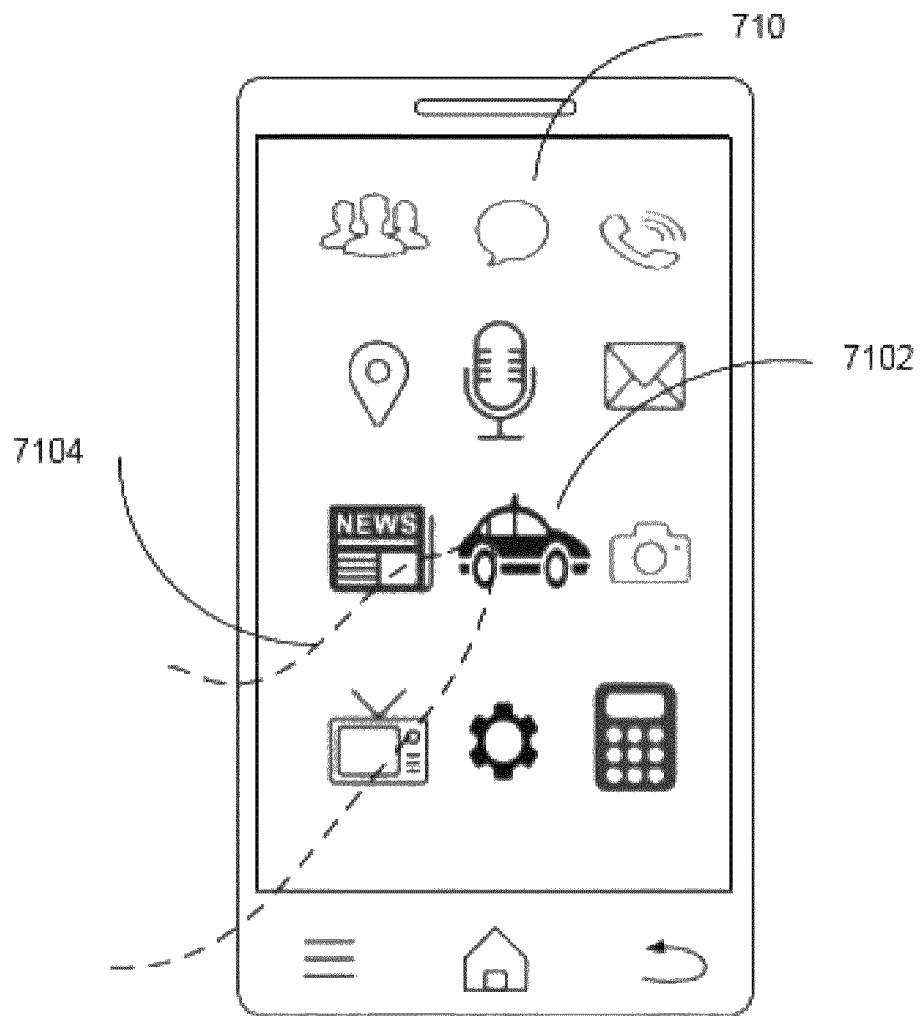
FIGS. 7-9 are schematic diagrams of an exemplary user interface according to some embodiments of the present disclosure.
Figure 8:
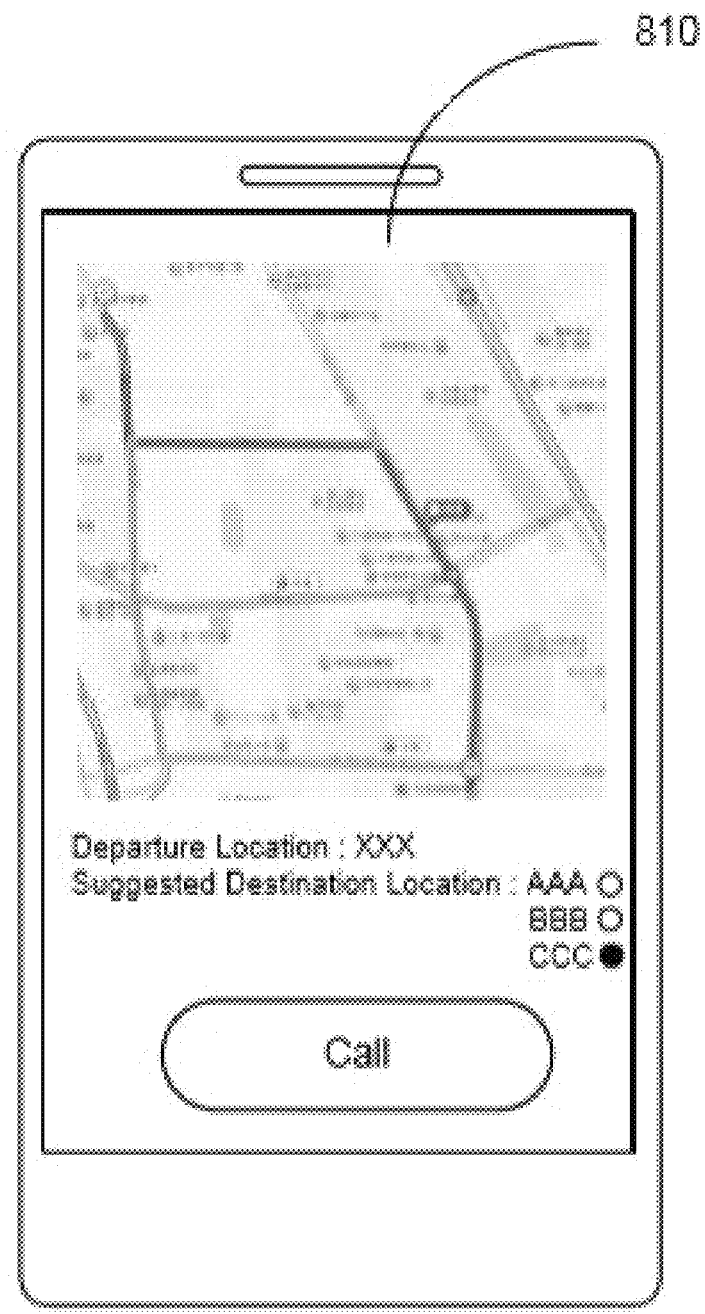

FIGS. 7-9 are schematic diagrams of an exemplary user interface according to some embodiments of the present disclosure. As shown in FIG. 7, in user interface 710, various applications installed in the user terminal may be displayed, including a travel service platform 7102. The user may trigger a service request by clicking on travel service platform 7102 installed in the user terminal by a finger 7104. After receiving the service request from the user, the user terminal may output one or more suggested destination locations to the user after performing operations 551 to 555 illustrated in FIG. 5B. As shown in FIG. 8, user interface 810 may display three suggested destination locations AAA, BBB, and CCC to the user. The user may finally select one of the three suggested destination locations as a true destination location. In FIG. 8, the user may select the suggested destination location CCC. As shown in FIG. 9, user interface 910 may directly display the suggested destination location AAA to the user.

It should be noted that the above descriptions of user interface are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the user interface may include one or more other indicators. However, those variations and modifications also fall within the scope of the present disclosure.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system configured to provide a predicted destination to a user, comprising:
   at least one non-transitory storage medium including a set of instructions; and
   at least one processor in communication with the at least one non-transitory storage medium, wherein when executing the set of instructions, the at least one processor is directed to:
      obtain a service request signal sent from a user terminal via wireless communication, wherein the service request signal encodes identifier data, a first departure location, and a first departure time;
      retrieve one or more historical records related to the identifier data, wherein a historical record includes a historical departure location, historical departure time and a historical destination location;
      determine the one or more historical records matching the first departure location and/or the first departure time;
      determine, using a pre-stored destination matching algorithm, a selection probability of the one or more historical destination location;
      determine the selection probability, for each historical destination location of the one or more historical records matching the first departure location and/or the first departure time;
      determine, based on the selection probability, a suggested destination location, which is the same as the one or more historical destination locations; and
      generate and display an indicator signifying the suggested destination location on a user interface of the user terminal;
         wherein to determine the selection probability related to the first departure location and the first departure time for each historical destination location of the one or more historical records, the at least one processor is further directed to:
            determine a first posterior probability, related to the first departure location, for each historical destination location of the one or more historical records, based on the historical departure location and the historical destination location of the one or more historical records;
            determine a second posterior probability, related to the first departure time, for each historical destination location of the one or more historical records, based on the historical departure time and the historical destination location of the one or more historical records; and
            determine the selection probability, related to the first departure location and the first departure time, for each historical destination location of the one or more historical records, based on the first posterior probability, the second posterior probability, and the prior probability.

2. The system of claim 1, wherein to determine the selection probability related to the first departure location and the first departure time for each historical destination location of the one or more historical records, the at least one processor is further directed to:
   determine the selection probability according to equation:

$$P(D_m \mid F, T) = \frac{P(F \mid D_m) P(T \mid D_m) * P(D_m)}{\sum_{m=1}^{N} P(F \mid D_m) P(F, T \mid D_m) * P(D_m)},$$

wherein $D_m$ denotes an mth historical destination location, F denotes the first departure location in the service request signal, T denotes the first departure time in the service request signal, $P(F|D_m)$ denotes the first posterior probability, $P(T|D_m)$ denotes the second posterior probability, $P(D_m)$ denotes the prior probability, N denotes a total number of the historical destination locations in the one or more historical destination locations, wherein $1 \leq m \leq N$, and both N and m are integers.

3. The system of claim 1, wherein to determine the selection probability related to the first departure location and the departure time for each historical destination location of the one or more historical records, the at least one processor is further directed to:
   determine a first posterior probability, related to the first departure location, for each historical destination location of the one or more historical records, based on the historical departure location and the historical destination location of the one or more historical records;
   determine a third posterior probability, related to the first departure location and each historical destination location of the one or more historical records, for the departure time, based on the historical departure location, the historical departure time and the historical destination location of the one or more historical records; and
   determine the selection probability, related to the first departure location and the departure time, for each historical location of the one or more historical records, based on the first posterior probability, the third posterior probability, and the prior probability.

4. The system of claim 3, wherein to determine the selection probability related to the first departure location and the first departure time for each historical destination location of the one or more historical records, the at least one processor is further directed to:
determine the selection probability according to an equation:

$$P(D_m \mid F, T) = \frac{P(T \mid F, D_m) P(T \mid D_m) * P(D_m)}{\sum_{m=1}^{N} P(T \mid F, D_m) P(T \mid D_m) * P(D_m)},$$

wherein $D_m$ denotes an mth historical destination location, F denotes the first departure location in the service request signal, T denotes the first departure time in the service request signal, $P(T|F, D_m)$ denotes the third posterior probability, $P(F|D_m)$ denotes the first posterior probability, $P(D_m)$ denotes the prior probability, N denotes a total number of the historical destination locations in the one or more historical destination locations, wherein $1 \leq m \leq N$, and both N and m are integers.

5. The system of claim 1, wherein the historical departure location provides a historical longitude and a historical latitude, and to determine the selection probability, related to the first departure location and the first departure time, for each historical destination location of the one or more historical records, the at least one processor is further directed to:
determine a centralized tendency matrix of the one or more historical records, wherein the centralized tendency matrix provides a historical longitude centralized tendency for the historical longitude of the one or more historical records, a historical latitude centralized tendency for the historical latitude of the one or more historical records, and a historical temporal centralized tendency for the historical departure time of the one or more historical records;
determine a covariance matrix, related to the historical longitude of the one or more historical records and the historical latitude of the one or more historical records and the historical departure time of the one or more historical records, based on the one or more historical records and the centralized tendency matrix;
determine a probability distribution based on the one or more historical records, the centralized tendency matrix, the prior probability and the covariance matrix; and
determine the selection probability, related to the first departure location and the first departure time, for each historical location of the one or more historical records, based on the probability distribution function.

6. The system of claim 5, wherein to determine the selection probability related to the first departure location and the first departure time for each historical destination location of the one or more historical records, the at least one processor is further directed to:
determine the selection probability according to equation:

$$P(D_m \mid F, T) = \frac{\frac{1}{(2\pi)^{3/2}} \frac{1}{\sqrt{\det C}} \exp\left[-\frac{1}{2}(X-\mu)^T C^{-1}(X-\mu)\right] * P(D_m)}{\sum_{m=1}^{N} \frac{1}{(2\pi)^{3/2}} \frac{1}{\sqrt{\det C}} \exp\left[-\frac{1}{2}(X-\mu)^T C^{-1}(X-\mu)\right] * P(D_m)},$$

wherein $D_m$ denotes an mth historical destination location, F denotes the first departure location in the service request signal, T denotes the first departure time in the service request signal, Flat denotes the latitude of the first departure location in the service request, Flng denotes the longitude of the first departure location in the service request, $$X = (T, \text{Flat}, \text{Flng}^T), \mu = (E\{T_p\}, E\{\text{Flat}_p\}, E\{\text{Flng}_p\})^T,$$

$$C = \begin{bmatrix} c_{11} & c_{12} & c_{13} \\ c_{21} & c_{22} & c_{23} \\ c_{31} & c_{32} & c_{33} \end{bmatrix}, c_{ij} = \text{Cov}(x_i, x_j) = E\{[x_i - \mu_i][x_j - \mu_j]\},$$

$$x_1 = T_p, x_2 = \text{Flat}_p, x_3 = \text{Flng}_p, i = \{1, 2, 3\}, j = \{1, 2, 3\},$$

$T_p$ denotes a historical departure time, $\text{Flat}_p$ denotes the latitude of a historical departure location, $\text{Flng}_p$ denotes the longitude of the historical departure location.

7. The system of claim 5, wherein the probability distribution is a multivariate Gaussian distribution.

8. The system of claim 1, wherein the historical departure location provides a historical longitude and a historical latitude, and to determine the selection probability related to the first departure location and the first departure time for each historical destination location of the one or more historical records, the at least one processor is further directed to:
determine a first centralized tendency matrix of a first condition based on the one or more historical records;
determine a first covariance matrix of the first condition based on the first centralized tendency matrix and the one or more historical records;
determine a second centralized tendency matrix of a second condition based on the one or more historical records;
determine a second covariance matrix of the second condition based on the second centralized tendency matrix and the one or more historical records; and
determine the selection probability, related to the first departure location and the departure time for each historical location of the one or more historical records, based on the first centralized tendency matrix of the first condition, the second centralized tendency matrix of the second condition, the first covariance matrix of the first condition and the second covariance matrix of the second condition.

9. The system of claim 8, wherein to determine the selection probability related to the first departure location and the first departure time for each historical destination location of the one or more historical records, the at least one processor is further directed to:
determine the selection probability according to equation:

$$P(Y = D_m \mid F, T) = \frac{1}{1 + \exp(X^T A X + \theta^T X + b)},$$

wherein $D_m$ denotes an mth historical destination location, F denotes the first departure location in the service request signal, T denotes the first departure time in the service request signal, Flat denotes the latitude of the first departure location in the service request, Flng denotes the longitude of the first departure location in the service request, $$X = (T, \text{Flat}, \text{Flng})^T, b = -\frac{1}{2}(\mu^T C^{-1}\mu - \mu'^T C'^{-1}\mu') + k,$$

$$k = \ln\left(\frac{1 - P(Y = D_m)}{P(Y = D_m)} \times \sqrt{\frac{|C'|}{|C|}}\right),$$

$$A = -\frac{1}{2}(C^{-1} - C'^{-1}), \theta^T = (\mu^T C^{-1} - \mu'^T C'^{-1}),$$

μ is an expectation vector of X under the condition of Y=$D_m$, μ' is an expectation vector of X under the condition of Y≠$D_m$, C is a covariance matrix of X under the condition of Y=$D_m$, C' is a covariance matrix of X under the condition of Y≠$D_m$, Y denotes a destination location variable, and the range of the destination location variable is all historical destination locations in the one or more historical records related to the identifier data.

10. The system of claim 1, wherein the at least one processor is further directed to:
   determine, as the suggested destination location, the one or more historical destination locations with the selection probability larger than a preset value; or
   determine, as the suggested destination location, one with a largest selection probability among the one or more historical destination locations if the one or more historical destination locations are more than one.

11. The system of claim 1, wherein the at least one processor is further directed to:
   obtain cancellation of the suggested destination location and a true destination location from the user via the user terminal; and
   generate an updated historical record based on the identifier data, including the first departure location, the first departure time and the true destination location.

12. A method implemented on at least one device each of which has at least one processor and a storage medium, the method comprising:
   obtaining a service request signal sent from a user terminal via wireless communication, wherein the service request signal encodes identifier data, a first departure location, and a first departure time;
   retrieving one or more historical records related to the identifier data, wherein a historical record includes a historical departure location, historical departure time and a historical destination location;
   determining the one or more historical records matching the first departure location and/or the first departure time;
   determining, using a pre-stored destination matching algorithm, a selection probability of the one or more historical destination location;
   determining the selection probability, for each historical destination location of the one or more historical records matching the first departure location and/or the first departure time;
   determining, based on the selection probability, a suggested destination location, which is the same as the one or more historical destination locations; and
   generating and displaying an indicator signifying the suggested destination location on a user interface of the user terminal;
   wherein the determining the selection probability related to the first departure location and the first departure time for each historical destination location of the one or more historical records further includes:
      determining a first posterior probability, related to the first departure location, for each historical destination location of the one or more historical records, based on the historical departure location and the historical destination location of the one or more historical records;
      determining a second posterior probability, related to the first departure time, for each historical destination location of the one or more historical records, based on the historical departure time and the historical destination location of the one or more historical records; and
      determining the selection probability, related to the first departure location and the first departure time, for each historical destination location of the one or more historical records, based on the first posterior probability, the second posterior probability, and the prior probability.

13. The method of claim 12, wherein the determining the selection probability related to the first departure location and the first departure time for each historical destination location of the one or more historical records further includes:
   determining the selection probability according to equation:

$$P(D_m | F, T) = \frac{P(F | D_m)P(T | D_m) * P(D_m)}{\sum_{m=1}^{N} P(F | D_m)P(F, T | D_m) * P(D_m)},$$

wherein $D_m$ denotes an mth historical destination location, F denotes the first departure location in the service request signal, T denotes the first departure time in the service request signal, $P(F|D_m)$ denotes the first posterior probability, $P(T|D_m)$ denotes the second posterior probability, $P(D_m)$ denotes the prior probability, N denotes a total number of the historical destination locations in the one or more historical destination locations, wherein 1≤m≤N, and both N and m are integers.

14. The method of claim 12, wherein determining the selection probability related to the first departure location and the departure time for each historical destination location of the one or more historical records further includes:
   determining a first posterior probability, related to the first departure location, for each historical destination location of the one or more historical records, based on the historical departure location and the historical destination location of the one or more historical records;
   determining a third posterior probability, related to the first departure location and each historical destination location of the one or more historical records, for the departure time, based on the historical departure location, the historical departure time and the historical destination location of the one or more historical records; and
   determining the selection probability, related to the first departure location and the departure time, for each historical location of the one or more historical records, based on the first posterior probability, the third posterior probability, and the prior probability.

15. The method of claim 14, wherein determining the selection probability related to the first departure location and the first departure time for each historical destination location of the one or more historical records further includes:

determining the selection probability according to an equation:

$$P(D_m \mid F, T) = \frac{P(T \mid F, D_m)P(T \mid D_m) * P(D_m)}{\sum_{m=1}^{N} P(T \mid F, D_m)P(T \mid D_m) * P(D_m)},$$

wherein $D_m$ denotes an mth historical destination location, F denotes the first departure location in the service request signal, T denotes the first departure time in the service request signal, $P(T|F,D_m)$ denotes the third posterior probability, $P(F|D_m)$ denotes the first posterior probability, $P(D_m)$ denotes the prior probability, N denotes a total number of the historical destination locations in the one or more historical destination locations, wherein $1 \leq m \leq N$, and both N and m are integers.

16. A non-transitory computer-readable storage medium storing instructions that, when executed by at least one processor of a system, cause the system to perform a method, the method comprising:

obtaining a service request signal sent from a user terminal via wireless communication, wherein the service request signal encodes identifier data, a first departure location, and a first departure time;

retrieving one or more historical records related to the identifier data, wherein a historical record includes a historical departure location, historical departure time and a historical destination location;

determining the one or more historical records matching the first departure location and/or the first departure time;

determining, using a pre-stored destination matching algorithm, a selection probability of the one or more historical destination location;

determining the selection probability, for each historical destination location of the one or more historical records matching the first departure location and/or the first departure time;

determining, based on the selection probability, a suggested destination location, which is the same as the one or more historical destination locations; and generating and displaying an indicator signifying the suggested destination location on a user interface of the user terminal;

wherein the determining the selection probability related to the first departure location and the first departure time for each historical destination location of the one or more historical records further includes:

determining a first posterior probability, related to the first departure location, for each historical destination location of the one or more historical records, based on the historical departure location and the historical destination location of the one or more historical records;

determining a second posterior probability, related to the first departure time, for each historical destination location of the one or more historical records, based on the historical departure time and the historical destination location of the one or more historical records; and determining the selection probability, related to the first departure location and the first departure time, for each historical destination location of the one or more historical records, based on the first posterior probability, the second posterior probability, and the prior probability.

* * * * *